United States Patent [19]
Gurner et al.

[11] Patent Number: 5,414,256
[45] Date of Patent: May 9, 1995

[54] APPARATUS FOR AND METHOD OF CONTROLLING A DEVICE BY SENSING RADIATION HAVING AN EMISSION SPACE AND A SENSING SPACE

[75] Inventors: Asaf Gurner, Tel-Aviv; Oded Y. Zur, Netanya, both of Israel

[73] Assignee: Interactive Light, Inc., Santa Monica, Calif.

[21] Appl. No.: 177,904

[22] Filed: Jan. 6, 1994

Related U.S. Application Data

[63] Continuation-in-part of Ser. No. 1,058, Jan. 6, 1993, which is a continuation-in-part of Ser. No. 776,669, Oct. 15, 1991, abandoned.

[30] Foreign Application Priority Data

Feb. 19, 1992 [IL] Israel ..................................... 101016

[51] Int. Cl.$^6$ ............................................. G01V 9/04
[52] U.S. Cl. ..................... 250/221; 364/410; 84/639
[58] Field of Search ............................ 250/221, 222.1; 364/410, 189; 84/639; 340/555, 556, 557; 345/158, 167, 145, 157

[56] References Cited

U.S. PATENT DOCUMENTS

| | | | |
|---|---|---|---|
| 5,017,770 | 5/1991 | Sigalov | 250/221 |
| 5,138,638 | 8/1992 | Frey | 250/221 |

*Primary Examiner*—David C. Nelms
*Assistant Examiner*—Que T. Le
*Attorney, Agent, or Firm*—Kirschstein, Ottinger, Israel & Schiffmiller

[57] ABSTRACT

An optical controller is capable of surrounding a player with a radiation screen from a plurality of panels, and enables the player to produce control signals for interface with a controlled instrument such as a musical instrument, a video game processor, etc. The insertion of the appendage of the player can produce a functional control signal. The relative position of the insertion of the appendage can be determined, for example, as a result of the intensity of the reflected radiation in the dispersing radiation screen and adjusted in elevation. The video game processing unit can play either a conventional video game that usually accepts eight functional control signals, or it can utilize the full capacities of the control signals available from the optical controller for enhanced play action.

17 Claims, 19 Drawing Sheets

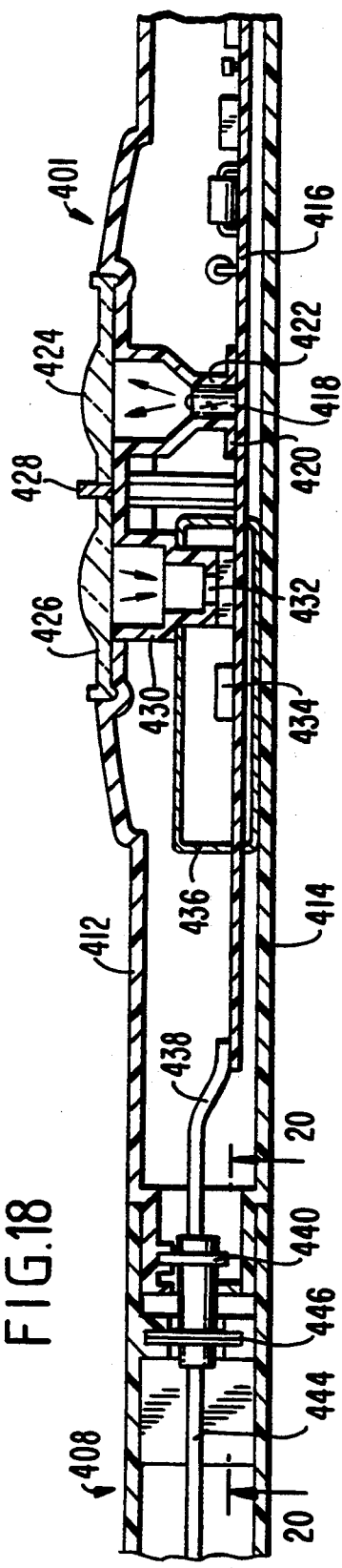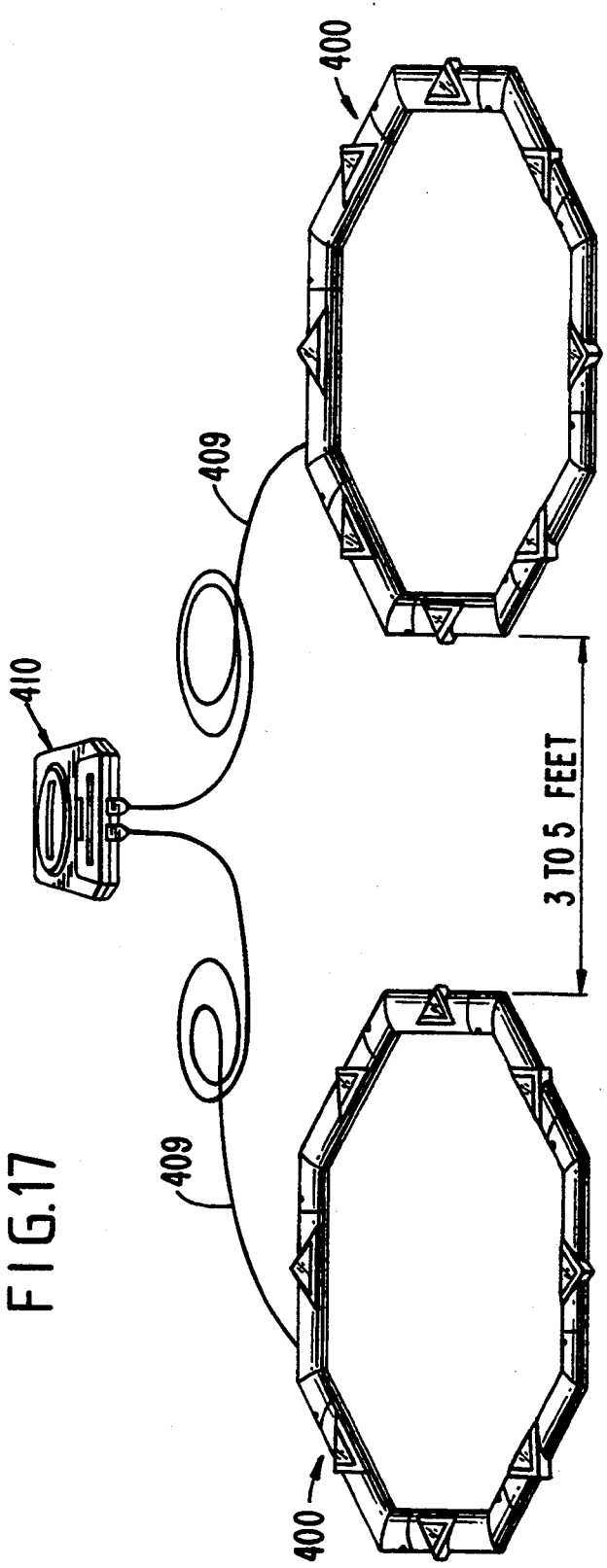

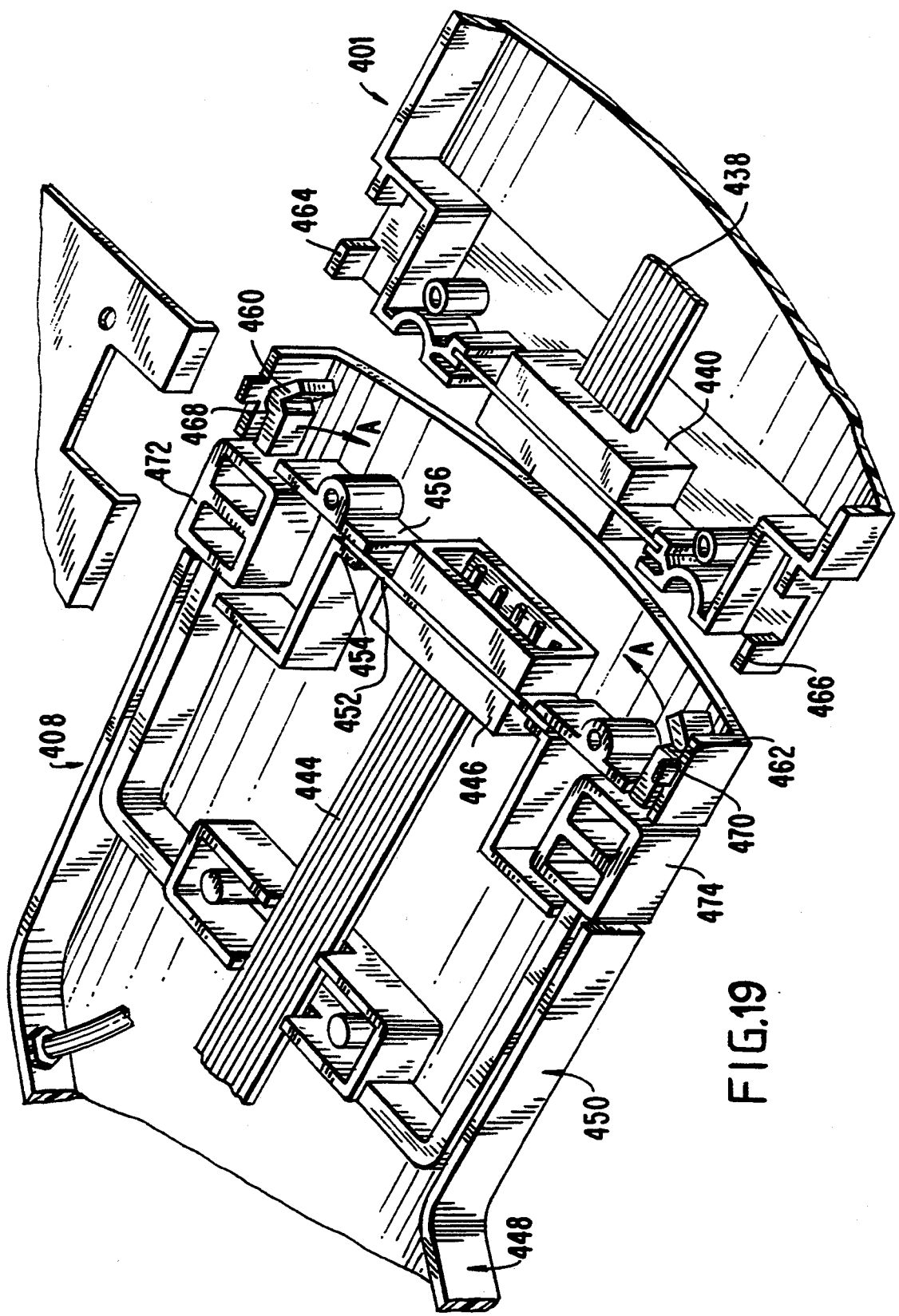

FIG. 21
FIG. 22
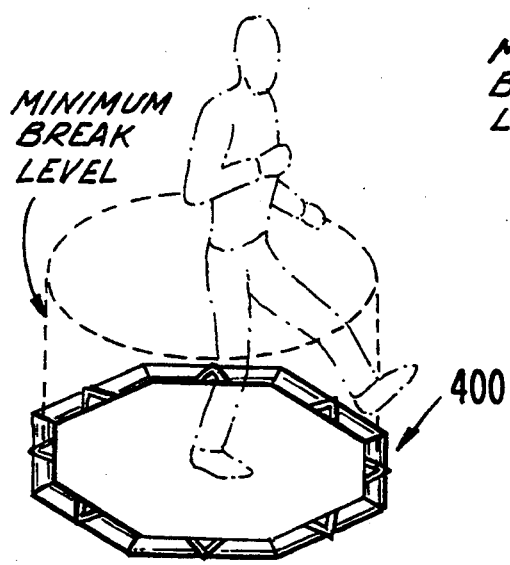
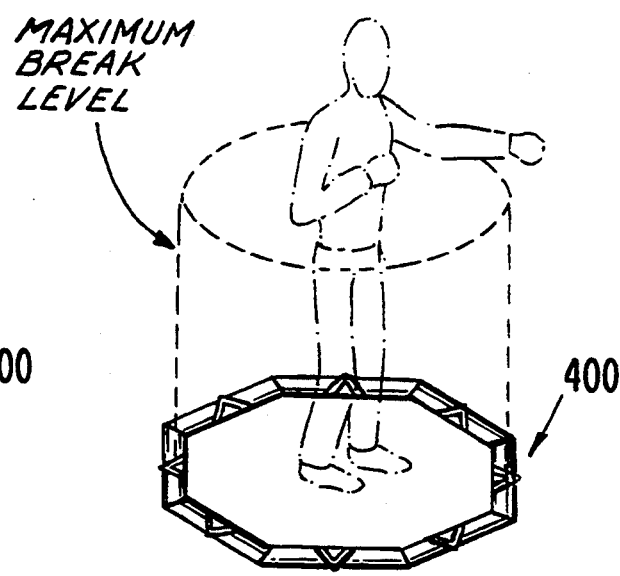
FIG. 23
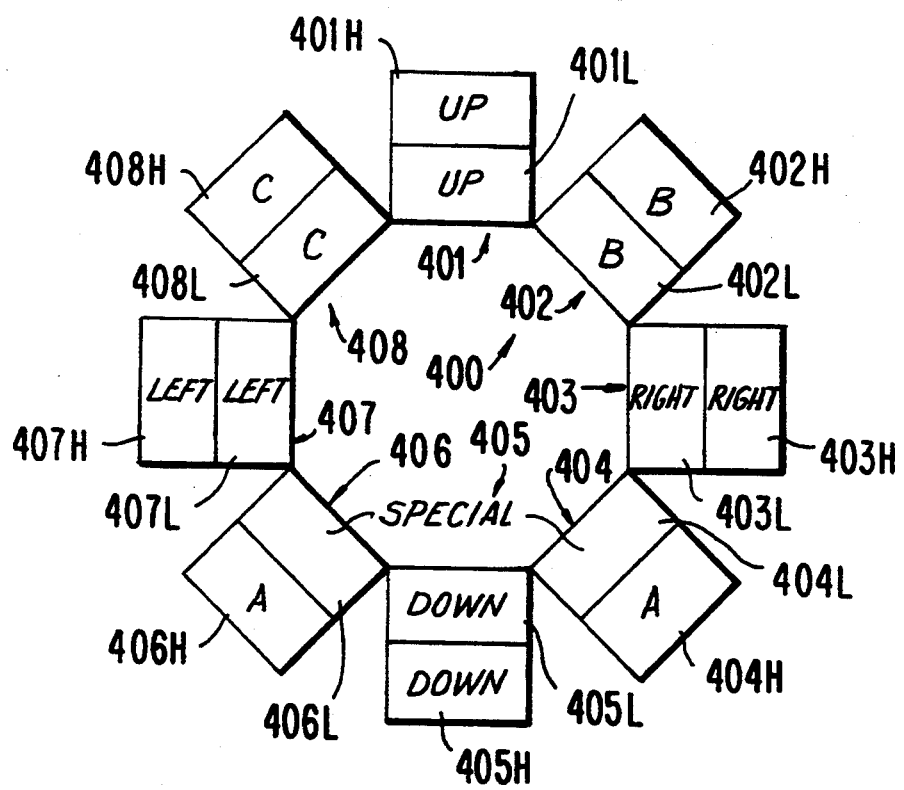

APPARATUS FOR AND METHOD OF CONTROLLING A DEVICE BY SENSING RADIATION HAVING AN EMISSION SPACE AND A SENSING SPACE

CROSS-REFERENCE TO RELATED APPLICATION

This application is a continuation-in-part of our U.S. patent application Ser. No. 08/001,058, filed Jan. 6, 1993, which, in turn, is a continuation-in-part of Ser. No. 07/776,669, filed Oct. 15, 1991, now abandoned.

BACKGROUND OF THE INVENTION

1. Field of the Invention

This invention relates to dynamically-activated optical instruments for producing control signals. More particularly, it relates to an optical instrument which is activated by dynamic stimuli, generally by motions of an operator's body appendages, and produces signals which can control a musical instrument, a computer-operated visual game, or other devices.

2. Description of Related Art

Apparatus for producing sounds by radiation have been known in the art for a long time period. They are based on the principle of producing radiation, modifying it, sensing the modifications, and translating the same to signals, e.g., electrical,or electronic signals, which, in turn, produce musical tones. The modifications of the radiation may be produced by the motion of the operator's body in a space that is traversed by the radiation. The operator will be referred to hereinafter as "the player."

French Patent No. 72.39367 utilizes radar radiation. The player's body reflects the radiation towards a sensor and the Doppler effect is produced, which generates signals that are translated into acoustic frequencies. The music may be generated as a function of the speed of the player's motion or of his distance from the radiation source.

French Patent No. 81.06219 uses laser radiation, which surrounds a space in which the player moves and the tones are produced by the interception of a ray by the player's body.

U.S. Pat. No. 4,429,607 describes an apparatus comprising a number of light emitters and sensors adjacent thereto, tones being produced by reflecting back, e.g., by means of a finger, an emitted ray to the corresponding sensor.

WO 87/02168 describes, among other things, an apparatus applying the same tone-producing means as the above-described U.S. patent, but using retroflective elements applied to the human body to produce reflection that is stronger than random reflection, due, e.g., to the ceiling. Alternatively, random reflections are neutralized by confining both the emitted and the reflected beams within a narrow tube. The application also describes a way of producing different octaves by sensing the order in which a plurality of laser rays are intercepted by the player's body.

PURPOSE OF THE INVENTION

It is a purpose of this invention to provide an optical apparatus which is adapted to produce, in response to dynamic stimuli, control signals for generating sounds or musical notes, or optical images or the like, or operating safety devices or interfaces, which is free from all the defects of the prior art apparatus.

It is another object of the invention to provide such an apparatus, which operates efficiently in any surroundings and is not affected by the shape and dimensions of the room in which it is placed or by objects that may be present in it.

It is a further object of the invention to provide such an apparatus which adjusts itself to different surroundings.

It is a still further purpose of the invention to provide such an apparatus which requires only one source of radiation.

It is a still further purpose of the invention to provide such an apparatus which operates by means of any desired kind of radiation.

It is a still further purpose of the invention to provide such an apparatus which adjusts its sensitivity to radiation, so as to constantly provide the desired response to the dynamic stimuli by which it is activated.

It is a still further purpose of the invention to provide such an apparatus that is extremely simple in structure and economical to make and to operate.

It is a still further object of the invention to provide a method for producing control signals by producing radiation in an operating environment, and producing control signals in a predetermined response to activating dynamic stimuli, such as a player's appendages, independently of the characteristics of the operating environment.

It is a still further object of the invention to provide a unique optical controller for use on a microprocessor video game system that can simulate a conventional controller in one mode of operation, and further provide, in another mode of operation, expanded control functions for computer games that have been appropriately programmed to accommodate an optical controller.

It is another object of the invention to provide an enhanced play of a computer game designed for a conventional 8-function controller through the use of a 16-function or greater optical controller that can simulate the conventional controller and further provide enhanced standard functions not normally available to a player.

It is another object of the invention to utilize a single source of radiation, such as infrared radiation, and a single sensor, and to shape the radiation emission space of the source to enable a simplified determination of the location of an object in the radiation space.

It is a still further object of the invention to enable an optical controller to distinguish between a player's hand/arm and foot/leg when introduced into a laterally-spreading radiation space from a single source of radiation.

It is yet another object of the invention to provide an optical controller that can particularly accommodate video games of action such as boxing, martial arts, sports, etc., while permitting the player to act out the role of the video character in real life simulation.

Other purposes-of the invention will appear as the description proceeds.

SUMMARY OF THE INVENTION

The apparatus according to the invention is characterized in that it comprises, in combination with a radiation source, at least one radiation sensor, means for activating a controlled device in response to radiation detected by the sensor, and means for regulating the sensitivity, or reactivity, of the activating means in such a way that they will not activate the controlled device in response to radiation received by the sensor in the absence of dynamic stimuli, but will activate the same whenever such stimuli are present.

By "dynamic stimuli" it is meant those changes in the radiation received by the sensors that are produced by a person using the apparatus for the purpose of rendering the controlled device operative to produce an effect that is proper to it, such as musical tones in the case of a musical instrument, video control signals for game actions in the case of visual games, the sending of appropriate commands in the case of an interface and the like.

The source of radiation may be constituted by at least one emitter that is part of the apparatus—that will be referred to as "internal (radiation) sources"—or by means that are not a part of the apparatus but provide radiation in the space, in which the apparatus is intended to operate—that will be referred to as "external (radiation) sources." Typically, an external source may be constituted by the lighting of the room in which the apparatus is intended to operate.

Preferably, the apparatus comprises a number of panel units or "segments" (as they will sometimes be called hereinafter). Each unit or segment comprises at least one sensor and, if the source of radiation is internal, at least one emitter.

In a preferred form of the invention, the sensitivity regulating means comprise means for determining two received-radiation thresholds, an upper one above which the activating means activate the controlled device and a lower one below which they deactivate the controlled device, the gap between the two levels, wherein the activating means remain inoperative, corresponds to a level of noise.

In a further preferred form of the invention, the sensor produces output signals in response to radiation received, and means are provided for sampling the signals, counting only the signals that are produced, within a certain time period, by radiation having an intensity above a predetermined minimum, and generating control signals in response to the number of the counted signals.

In a particular form of the invention, the activating and sensitivity regulating means comprise processor means and logic circuits for activating emitter means to emit radiation pulses, sampling the sensor output signals in a predetermined timed relationship to the emitted pulses, deriving from the sampled sensor output signals a sensing parameter, comparing the value of the sensing parameter with predetermined reference values thereof, generating control, activating, and deactivating signals, and transmitting the same to the controlled device, depending on the result of the comparison.

The word "radiation," as used herein, includes any kind of radiation, such as infrared, ultrasonic, visible light or laser radiation, or microwaves or other kinds of electromagnetic waves and, in general, any radiation that may be emitted and received by means known in the art.

The expression "control signals," as used herein, includes any electrical or electronic signals or any signals that may be produced by the activating means in response to sensor output signals due to radiation received by the sensor. The control signals, as already stated, are used to control other devices, most commonly musical instruments or computer-controlled visual games, or other computers or interfaces and, in general, any computer-controlled or electrically- or electronically-controlled devices, generally designated herein as "controlled devices." Since a typical—though not the only—use of the instrument according to the invention is to control musical instruments or visual games, the person using the apparatus and producing or controlling the dynamic stimuli which activate it, will hereinafter be called "the player."

The invention also comprises a method for producing control signals in response to dynamic stimuli, which comprises creating radiation in a defined space, sensing a physically, generally quantitatively, definable characteristic of the radiation received at one or more points in the space, determining, in a zeroing operation, the value of a sensing parameter, having a predetermined correlation to the characteristic, in the absence of dynamic stimuli—hereinafter called the "reference threshold value" of the parameter—and thereafter, in the normal operation of the apparatus, repeatedly determining the value of the same sensing parameter and producing a control signal whenever a predetermined deviation from the reference threshold value is detected. The radiation characteristic will generally be defined in terms of intensity, but may be defined otherwise, e.g., in terms of frequency, etc. It may not, and generally will not, be quantitatively determined since it is represented, in carrying out the invention, by the sensing parameter. The sensing parameter may be defined, e.g., as a number of pulses in a given time interval, or may be defined in terms of different variables, such as a time elapsed between emission and reception of radiation, a frequency, etc. The correlation between the sensing parameter and the characteristic may be an identity, viz. the parameter may be a measure of the characteristic, or the parameter and the characteristic may be different even in nature, and any convenient correlation between them may be established, as will be better understood hereinafter. The correlation may be wholly empirical and it may vary in different operating environments and/or circumstances, as will be better understood hereinafter.

Preferably a different control signal is associated with each sensor and, therefore, with each point at which the received radiation is sensed. For instance, the output signal associated with each sensor may be used to produce a given musical tone, by which term is meant any sound having musical significance and, in general, a definite pitch which, in the customary scales, such as the chromatic scale, is physically definable in terms of basic frequency and octave, or it may produce an instruction to a computer to carry out a given operation, such as the production of an image or its modification or displacement, or any other predetermined action of any device controlled by the instrument according to the invention.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 17 is a perspective view of two controllers of the type shown in FIG. 15;

FIG. 18 is an enlarged, sectional view taken on line ]8—]8 of FIG. 15;

FIG. 19 is an enlarged, broken-away, perspective exploded view of the interconnection between panels of the controller of FIG. 15;

FIGS. 21 and 22 are diagrammatic perspective views illustrating the break level adjustment feature of the FIG. 15 embodiment; and FIG. 23 is a schematic view illustrating enhanced play action features of the FIG. 15 embodiment.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an optical controller for producing control signals.

Figure 1:
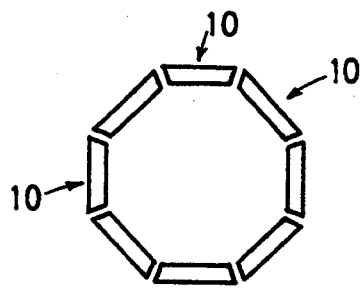
FIG. 1 schematically illustrates a polygon controller made from eight units, according to a preferred embodiment of the invention.
Figure 2A:
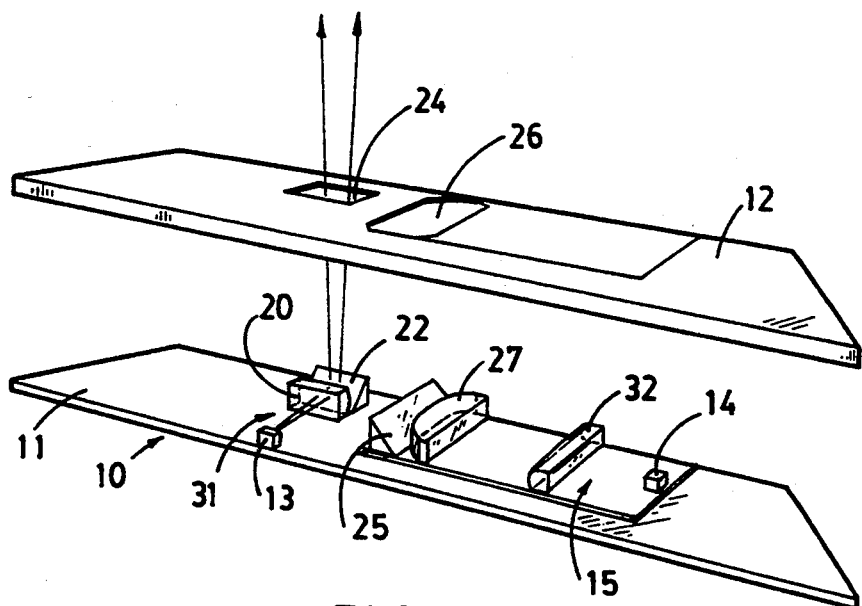
FIGS. 2a-2d schematically illustrate the emitters and sensors of a unit according to another embodiment of the invention.
Figure 2B:
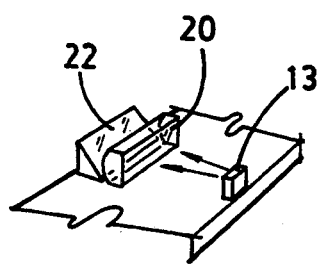
Figure 2C:
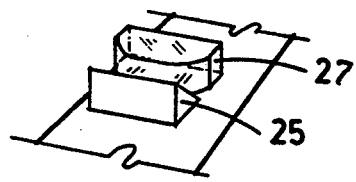
Figure 2D:
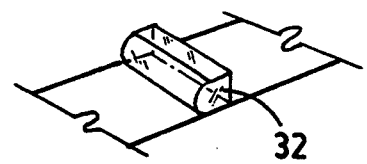

In the preferred embodiment illustrated in FIGS. 1 and 2, the apparatus according to the invention comprises a number of panel units from 1 upwards to 8 in the specific example illustrated, but this number has no particular significance and may be changed at will. Each panel unit has the form of a segment 10, so that the succession of those segments in mutual abutment constitutes a polygon, the player generally standing inside the polygon itself. Each segment 10 comprises a bottom portion of base 11 and a top portion or cover 12, connected to the base in any suitable way. In FIG. 2 a cover 12 is shown as removed from the base 11 and turned upside down, to show its inner surface. Base 11 carries a single emitter assembly generally indicated at 31 (although this latter may be omitted, as will be explained hereinafter) and a sensor assembly generally indicated at 15. The top cover 12 is provided with a window 24, over the emitter assembly, and a window 26, over the sensor assembly. The emitter assembly comprises an emitter 13, which may be, e.g., an LED (light-emitting diode) such as an infrared emitting diode or any other kind of emitter, and preferably, but not necessarily, means for directing the emitted radiation beam in a predetermined direction such as an optical lens assembly. In the embodiment described, the optical axis or direction of the beam is essentially vertical and is obtained by concentrating the radiation emitted by the LED by means of a cylindrical lens 20 and directing it onto a mirror 22, slanted at about 45 degrees to the vertical, from which the beam is reflected generally upward. These elements are shown in perspective in FIG. 2b. The reflected radiation passes through window 24 and forms an upwardly-directed beam. The beam, of course, is outwardly flared from its vertex, viz. from the level of the emitter, upward, and has the general shape of a pyramid having a generally quadrilateral cross-section or base. The geometry of its base depends on the lens 20 which, being cylindrical, tends to produce a beam that is elongated parallel to the direction of the lens axis. The specific intensity of the radiation, viz. the amount of radiation which passes through a unit surface of a horizontal cross-section of the beam, decreases from the vertex of the emission space upward..

The sensing assembly 15 comprises a mirror 25, slanting at about 45 degrees to the vertical, on which radiation reflected by the ceiling of the room in which the apparatus is placed, or by any other reflecting body which crosses the emission space, impinges after having passed through opening 26 of cover 12, aligned with the mirror. Mirror 25 reflects the radiation to lens 27, these elements being shown in perspective in FIG. 2d. From lens 27 the radiation reaches cylindrical lens 32, shown in perspective in FIG. 2c. From cylindrical lens 32, the radiation reaches a sensor, e.g., a photoelectric cell 14, which produces an electrical signal in response to the radiation received. The geometry of the sensing assembly determines a different sensing beam for each unit 10 so that the units will not interfere with each other—viz. the optical components described and the openings in the cover 12 are so dimensioned and positioned that only the radiation from a certain space—"sensing beam"—reaches each sensor, and the radiation which reaches any given sensor does not reach any of the others. It will be understood that the optical components previously described and their disposition are not critical, and any skilled person can select components that are different in whole or in part and arrange them in a totally or partially different way in order to obtain the desired emission and sensing beams. As already noted, it is not necessary that each segment 10 should comprise an emitter assembly. The apparatus according to the invention may comprise, instead, one or more separate emitters, each of which emits radiation that will be received by more than one sensor, in which case there will not be associated with each segment an emitter assembly and an emitter beam.

The operation of a single element of the apparatus, viz. an emitter and a sensor, which, in the embodiment described, are associated with a given segment 10, will now be described. It will be understood that the same operations will take place for all other elements, although preferably not at the same time, in order to avoid interference between different elements. In other words, a central processor or computer such as that schematically indicated in FIG. 4 (which figure is self-explanatory), e.g., a microprocessor, will activate the several elements of the apparatus at successive time intervals, which, however, are so short as to give the effect of a continuous operation of the apparatus. It will also be understood that, as already stated, an emitter may cooperate with different sensors and, thus, may be considered as a part of a plurality of elements of the apparatus. In the embodiment illustrated, the radiation is emitted by pulses. The frequency of the pulses may be controlled by the central processor. Let us assume, by way of example, that it is 2000 pulses per second. The sensor of the element under consideration generates an output signal in response to a pulse received, which is also a pulse, the length or duration of which increases with increasing intensity of the radiation received. To distinguish it from the pulses sent by the emitter, it will be called "sensor pulse" or "sensor signal." When the processor activates the element, it triggers the emission of the pulses by the emitter. After a certain time, the processor samples the output of the sensor. The time elapsed between the triggering of the emission and the sampling of the sensor output will be called "sample delay time" and indicated by SDT. The SDT can be changed by the computer. It influences the operation of the apparatus and, therefore, it is desirably set at an optimal value, the determination of which will be explained hereinafter.

When the computer samples the sensor output, it senses and registers at each sampling whether a sensor signal is still being sent. If the sensor has not received an emitter pulse and, therefore, has not responded by sending a sensor signal, or if it has received a weak emitter pulse and has therefore sent a sensor signal that has lasted less than the time SDT, the computer will register the absence of such a signal (zero). If the sensor has received an emitter pulse strong enough to cause it to emit a sensor signal the duration of which exceeds SDT, the computer will register the existence of the signal (one). The computer will count the number of sensor pulses (ones) it detects during a given length of time or "measuring cycle." The maximum number of sensor pulses that could be detected during a measuring cycle is obviously equal to the number of emitter pulses that have been sent during the cycle, which depends on the duration of the cycle and on the frequency of the emitter pulses. In this example, it is assumed that the maximum number of sensor pulses is 64, corresponding to a duration of each measuring cycle of about 1/30-second (more exactly 64/2000). It is seen that the number of sensor pulses detected in each measuring cycle, which will be called "intensity number" and will be indicated by IN (and is comprised in the case described between zero and 64) provides a measure of the intensity of the radiation received by the sensor and is, in this embodiment, the sensing parameter. However, the radiation intensity and the number IN of sensor pulses detected are not proportional, since the latter number is influenced by other factors, mainly by the value of SDT, as it is clear that if SDT increase, more sensor pulses will go undetected, all other things being equal.

The operation by which the apparatus is prepared for operation in a given environment, which will be called the "zeroing operation," will now be described with reference to a single sensor. During the zeroing operation, none of the dynamic stimuli that will be applied to the apparatus and to which the apparatus will react in normal operation, are present. The apparatus is started and the emitters begin to emit IR (or other radiation) pulses controlled by the computer. The sensor will output sensor pulses and the computer will sample them and compute the IN value by counting the pulses—all as explained previously—and will register the value in its memory, all within a few thousands of a second (e.g., 30 milliseconds). Since no dynamic stimuli are present during the zeroing operation, the value may be called "idle mode intensity number" and indicated by IDN. IDN is the reference threshold value or, the sensing parameter IN. Due to the internal and external electronic and optical noise, this number is not stable and varies from measuring cycle to measuring cycle. Its maximum variation will be called "noise number" and indicated by NN. It is determined empirically by operating the apparatus in the environment in which it is intended to operate normally, which is the same in which the zeroing operation is carried out, and under normal conditions, e.g., normal room temperature, and measuring IDN repeatedly over a sufficient length of time, e.g., one hour. Alternatively, NN could be calculated by summing all the contributions of the various components, e.g., sensor noise, amplifier noise, digital noise, external induction noise, optical noise from external radiation sources, etc., each of which is individually known or easily determined by persons skilled in the art.

According to an elementary embodiment of the invention, the apparatus could be programmed in such a way as to actuate the controlled device, be it a terminal device or an interface to a terminal device, to perform its operations when the apparatus is subject to a radiation the intensity of which corresponds to a sensing parameter IN equal to or less than the reference threshold value IDN, viz. which is not higher than the radiation it would receive in the absence of dynamic stimuli (as this expression has been defined previously). Thus the controlled device would be activated when at least one sensor receives a radiation more intense than that expressed by IDN and deactivated when all sensors receive a radiation equal to or lower than that expressed by IDN. However, the presence of noise might cause the controlled device to be activated in the absence of dynamic stimuli. To avoid this, the activation threshold should be increased by NN.

It is desirable to control the sensitivity of the apparatus, viz. the intensity of the dynamic stimulus that is required in order that the actuated device will respond. For this purpose, both activation or lower and deactivation or higher thresholds are increased by a factor that will be called the "sensitivity number" and will be indicated by SN. In this way the apparatus will only respond to dynamic stimuli that are not too small and the minimum intensity of which increases with increasing SN. The lower and higher thresholds, indicated respectively as OFFIN and ONIN, will be expressed by:

$$OFFIN = IDN + SN$$

$$ONIN = IDN + SN + NN$$

SN is determined empirically by operating the apparatus under normal conditions and varying it until the apparatus responds satisfactorily to a given dynamic stimulus: e.g., the action of a typical object, such as the hand of the player or an optically equivalent object, at a typical height, e.g., 1.2 meters, at the center of the area in which the player normally operates. The value of SN, and well as that of NN, are registered in the computer's memory as known parameters, as part of the zeroing operation.

It will be clear from the above description that the first parameter to be determined or, more correctly, to which an optimum value must be attributed, in the zeroing operation, is SDT. The sensors have a typical delay time between the time they receive the optical pulse and the time they generate the electronic response. As mentioned earlier, the length of the response signal is proportional to the intensity of the optical signal received. In order to optimize SDT, its value is set at first as close after the delay time as possible, in order to achieve maximum sensitivity. This value will be called "initial SDT"—ISDT. A weak optical signal will cause the sensor to generate a short electronic pulse, but it will still be identified by the processor because it samples the output of the sensor, right after the pulse is started. The processor will measure the IDN using ISDT. If the resulting number is too high in order for OFFIN and ONIN to be in their designated range because of a very strong optical signal (IDN>64−(NN+SN)), the processor will lower the sensitivity by incrementing the SDT by 1 microsecond, and check the IDN again.

By incrementing SDT by 1 microsecond, the processor samples the output of the sensor 1 microsecond+ISDT after their response. Only emitted optical signals which cause pulses 1 microsecond+ISDT to be generated by the sensor will be identified by the processor. These pulses have to be stronger in their intensity. The processor will repeat this procedure until the sensitivity decreases so that IDN reaches a satisfactory value, which should be in the range: 0<IDN<(64−(NN+SN)). The SDT which produces the result will be registered in the processor's memory and maintained in the normal operation of the apparatus, at least unless and until a change of environment makes a new zeroing operation necessary. It may be called "working SDT" and indicated by WSDT.

Figure 3:
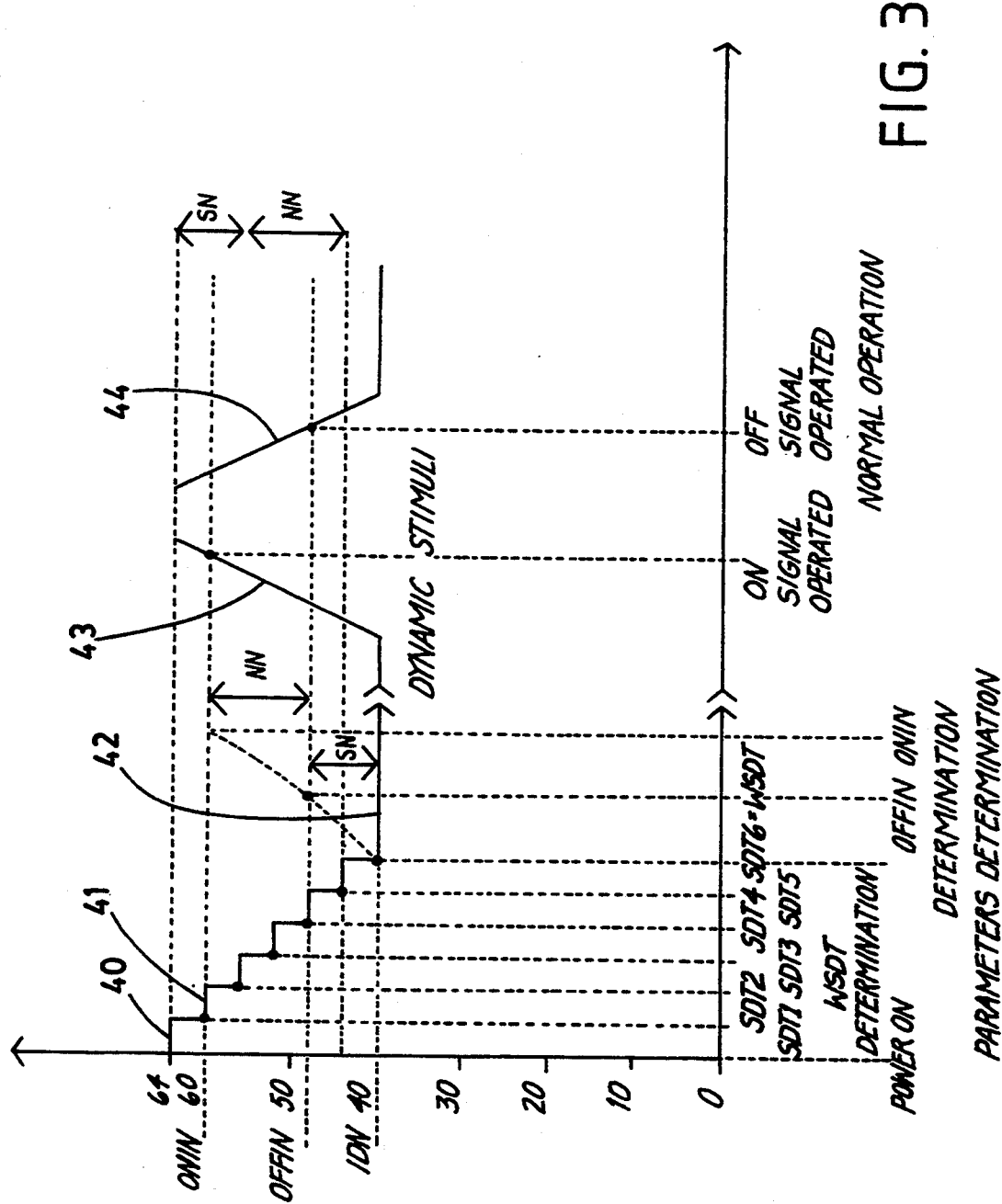
FIG. 3 is a diagram illustrating the operation of a device according to another embodiment of the invention.

These operations are illustrated in the diagram of FIG. 3, wherein the abscissae are times and the ordinate is the number of sensor pulses counted in a measuring cycle. At the beginning of the zeroing operation, indicated by segment 40, SDT is very small and, as a result, IN is too high (64 as shown in the diagram). SDT is then increased by 1 microsecond (segment 41) whereby IN decreases to 60, which is still too high. SDT is repeatedly increased, producing the successive segments shown, and IN decreases, until an IN of 40 is reached (segment 42). This is a satisfactory value, for, with the values of SN and NN which have been previously established, ONIN is 60, comprised in the 0–64 interval. The SDT which has produced the value of IN—which is taken as IDN=40, based on which ONIN and OFFIN are calculated—will be used throughout the operation of the apparatus and, therefore, becomes WSDT. Slanted lines 43 and 44 illustrate how the apparatus will work in normal operation. If a dynamic stimulus is present, IN will rise from IDN to 60, which is ONIN, and the controlled device will be activated. If the dynamic stimulus ceases, IN will decrease from 60 to OFFIN, at which point the controlled device will be deactivated.

The two thresholds OFFIN and ONIN are actually numbers of pulses counted in a measuring cycle, viz. their dimension is $sec^{-1}$. Of course, NN and SN are expressed in the same units. If the number of pulses emitted by the emitter is 64 per measuring cycle, as has been assumed herein by way of example, both OFFIN and ONIN must be comprised between zero and 64. Increasing the number of emitted pulses increases not only the accuracy of the apparatus, but also its response time, while decreasing the number decreases both accuracy and response time. Since high accuracy and low response time are desirable, a compromise must be reached. In most practical cases, setting the number of pulses at 64 per measuring cycle achieves a good compromise.

During normal operation, the computer checks the IN every 30–40 milliseconds. If the IN value rises above ONIN, the computer operates an "on" signal, viz. activates the controlled device (e.g., video/computer game, electronic musical device or interface). If the IN value is between OFFIN and ONIN, no change is effected and the controlled device continues to operate or not to operate, as the case may be. If the IN value decreases below OFFIN, the computer generates an "off" signal, viz. deactivates the controlled device. The gap between the two thresholds prevents noise from sending such "on" and "off" signals at inappropriate values of IN.

When more than one sensor is employed, each sensor will be assigned its own specific SDT, OFFIN, and ONIN values, and the computer will compare the IN of each sensor with its specific parameters, and will produce "on" and "off" signals accordingly.

In this embodiment of the invention, the intensity of the radiation received by a sensor is the quantitatively definable characteristic of the radiation received. The number of sensor pulses counted by the processor in a measuring cycle is the sensing parameter. The correlation between the parameter and the characteristic is the relationship between each intensity of radiation and the corresponding number of sensor pulses, which relationship depends on the apparatus characteristics and on the particular SDT chosen. The reference threshold value of the sensing parameter is the number of pulses IN measured in the environment in which the apparatus is intended to operate and in the absence of dynamic stimuli. The deviation from the reference threshold value which causes the production of a control. ("on" or "off") signal is a predetermined deviation of the sensing parameter, in excess, from the threshold value—preferably a deviation in excess equal to the sum of the noise number and the sensitivity number, as previously defined.

The zeroing operation has been described with reference to a single sensor. The computer will relate separately to each sensor in the apparatus and if, e.g., there are eight segments and eight sensors in the apparatus, the computer will concurrently zero each one of them independently. Depending on the shape of the room, the objects contained therein and the position of the apparatus within it, the various parameters, including the measuring cycle, used or established in zeroing the apparatus, may be different from sensor to sensor and from unit 10 to unit 10.

When the instrument is used, a player is stationed in the playing area, which is, in general, the area within the polygon defined by the segments 10, and moves parts of his body in such a way as to produce dynamic stimuli, by creating changes in the radiation received by the various sensors. This occurs because in the absence of a player the radiation emitted by the emitters carried by the apparatus segments, or by the central emitter or emitters, is reflected by the ceiling of the room in which the apparatus is placed, but when a part of the body of a player penetrates an emission beam and reflects the radiation to a sensor, it is closer to the emitter than the ceiling. It is obvious that the closer the reflecting surface is to the emitter, the more intense will the reflected radiation be. The computer will then receive from the sensor or sensors so affected, within the measuring cycle, a number of pulses different—greater, in this embodiment, but possibly smaller in other embodiments, as will be explained hereinafter—than that which it receives during the zeroing operation, viz. the sensing parameter will deviate from its reference threshold value and reach its activating or upper threshold value. The computer is so programmed as to send to the controlled device, whenever this occurs, an appropriate activating instruction, which will depend on the nature and operation of the controlled device, on the particular sensor to which the sensing parameter relates, and optionally on other conditions or parameters which the computer has been programmed to take into account. As noted, the controlled device may be any conventional device for creating electrical or electronic signals or signals of another kind; e.g., an interface, or a terminal apparatus, viz. an instrument or device for producing the finally desired effect, such as musical tones or optical images, the actuation of a safety device, etc., or even another computer. It will be understood that the computer may merely register that there is a dynamic stimulus and, therefore, produce in all cases a single output instruction associated with the particular sensor which has received the dynamic stimulus, regardless of the intensity of the latter, or it may take that intensity into account and output instructions which are a function of it, viz., in the example described, a function of the number of pulses received during the measuring cycle, to cause the controlled device to produce effects of different intensities, e.g., stronger or weaker musical tones.

In this embodiment, each segment of the apparatus is provided with an emitter. However, as has been noted, a single emitter may be used for the whole apparatus. In this case, during the zeroing operation the single emitter will beam its radiation towards the ceiling, and the radiation reflected by the ceiling is that which will be sensed by the sensors. In the zeroing operation there is no obstacle between the ceiling and the sensors, and the reflected radiation received by the latter is at a maximum. When a player operates the apparatus, he will intercept with his body part of the reflected radiation, and the intensity of the radiation received by the sensors will be lower than during the zeroing operation. In other words, the dynamic stimuli will consist in a decrease of the intensity of the radiation received by the sensors. The apparatus will be so arranged as to respond to such decrease in the way in which it responds to an increase thereof in the embodiment previously described, viz. it will generate an ON signal in response to decrease of the sensed radiation below the lower limit established in the zeroing operation—which operation is analogous to that previously described—and an OFF signal in response to an increase of the sensed radiation above the upper limit established in the zeroing operation.

Further to illustrate the invention, a microcontroller program for one sensor/emitter couple is reported hereinafter. The program is written in C. The term "MIDI" indicates a musical instrument digital interface (a protocol used by all electronic musical instruments).

PROGRAM

```
/* beginning of program */
int         SDT, IN, IDN, ONIN, OFFIN;              /* variables */
const int   ISDT=1, N=10, SN=5, cycle time=30       /* constants */
main ()
{
zeroing ();              /* zeroing phase */
while (0==0)             /* continues normal operation */
    {
    IN=measure cycle ();       /* measure and get result */
    if (IN>ONIN) out on ();    /* send on signal */
    if (IN<OFFIN) out off ();  /* send off signal */
    }
{
int measure cycle
}
int transmission, counter;
start timer (CYCLE TIME) ;
for (transmission=0: transmission<64; transmission++)
    {
    transmit pulse ();
    delay (SDT);
    counter=counter+receive pulse ();
    }
wait end timer ();
return (counter);
}
void transmit pulse ()
{
/* procedure for transmitting one pulse */
}
int receive pulse ()
{
/* procedure for sampling the sensor output and returning
```

```
                                  -continued
                                   PROGRAM "1" of sensor high, "0" if sensor low */
}
void start timer (CYCLE TIME)
{
/* procedure for loading the internal timer to the CYCLE
TIME=90 msecs, and running it */
void wait end timer ()
{
/* procedure that waits until the timer measured the time
loaded to it at start timer () */
}
void out on ()
{
/* procedure for sending an "on" code with a note value
via *"MIDI" protocol to musical instrument */
}
void out off ()
{
/* procedure for sensing an "off" code with a note value
via "MIDI" protocol to musical instrument */
{
void zeroing ()
}
SDT=ISDT:                    /* set SDT to ISDT      */
IN=measure cycle ();         /* get first IN value   */
WHILE (IN>(64−(SN+NN)))      /* proceed until SDT is proper */
    {
    SDT=SDT+1;
    IN=measure cycle ();
    }         /* leaving only if SDT proper */
IDN=measure cycle ();
OFFIN = IDN+SN;
ONIN = IDN+SN+NN;
}
/* end of program */
```

This program should be completed and compiled according to the microcontroller which is used.

We used: "INTERL"—8051 microcontroller.
The emitters used: "OPTEK"—OP240 IREDS.
The sensors used: "SEIMENS"—SFH240 PIN-PHOTODIODES with TBA2800 amplifier.

It will be understood that the method which is carried out by the apparatus described in the aforesaid example may be carried out by using radiations which are different from infrared radiation, e.g., ultrasonic waves or microwaves. In such cases the apparatus will be adjusted to emit and receive the particular radiation that is being used. The system which involves producing pulses and counting the number of pulses received in a given time interval can still be used, but in other cases, the sensing parameter may not count a number of pulses. It may be, e.g., a direct measure of a radiation intensity, e.g., a tension or current produced by a photoelectric cell, and the correlation between the sensing parameter and the physically definable characteristic of the radiation may be determined by the fact that the sensitivity of the cell may be adjusted so that the tension or current has a predetermined reference threshold value in the absence of dynamic stimuli. The instruction output by the computer, when the apparatus is in use, is a function of the difference between the tension or current produced and their reference threshold values. In other cases, the sensing parameter and the radiation characteristic may coincide, and the instructions output by the computer will be a function of the difference between the value of the characteristic in the absence and in the presence of dynamic stimuli. This may occur, e.g., when the radiation characteristic is the time gap between the emission of a radiation and its reception by the sensor. However, in this case also, the radiation may be produced by pulses and the time gap measured for each pulse. The computer will then zero the apparatus by registering, for each sensor, the time gap in the absence of dynamic stimuli. It will then register the time gap in the presence of such stimuli and output and instruction which is the function of their difference.

Figure 5A:
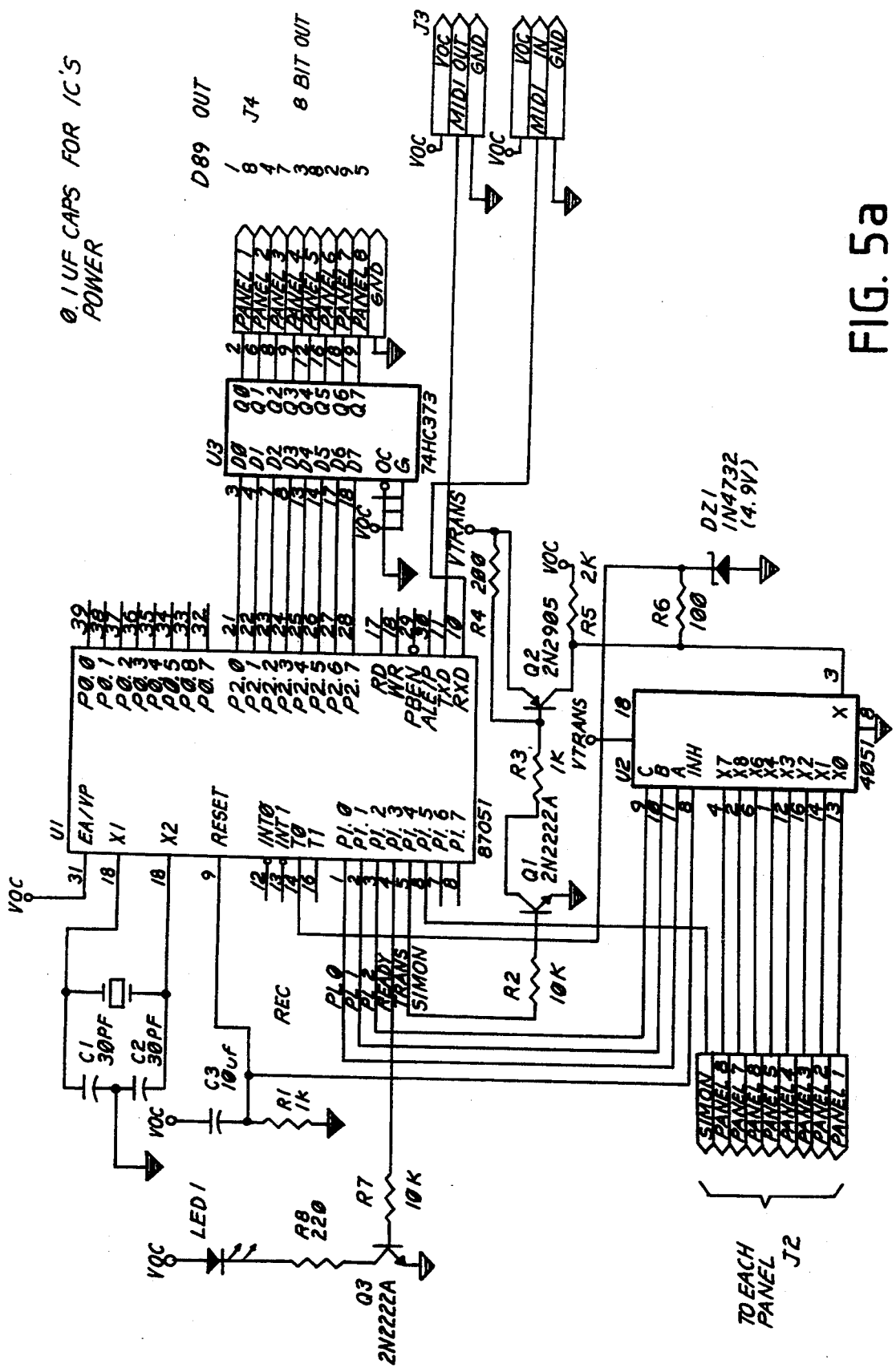
FIGS. 5a, 5b and 6 are electronic diagrams of component parts of a specific embodiment of the invention and, more precisely, of a control circuit and a panel circuit, respectively.
Figure 5B:
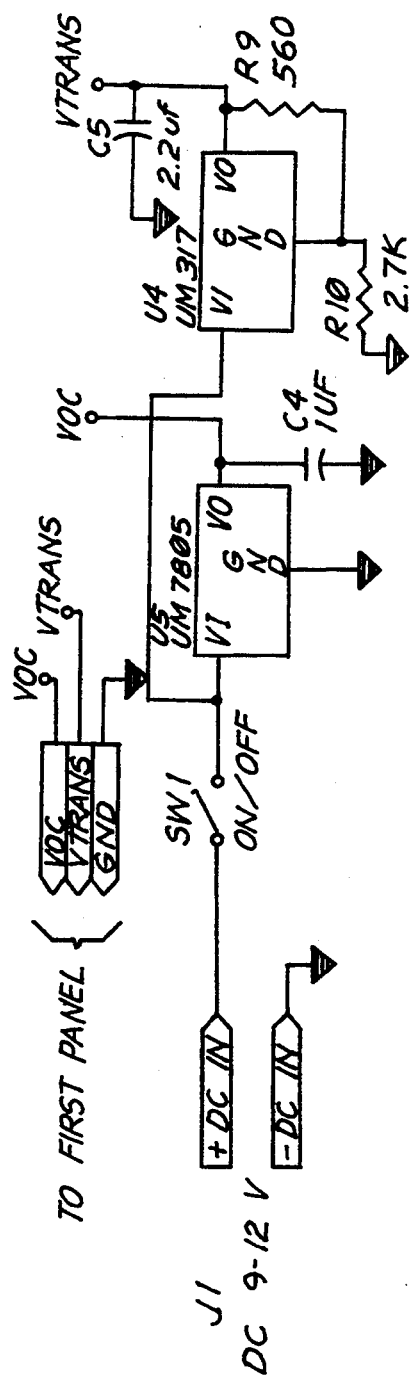
Figure 6:
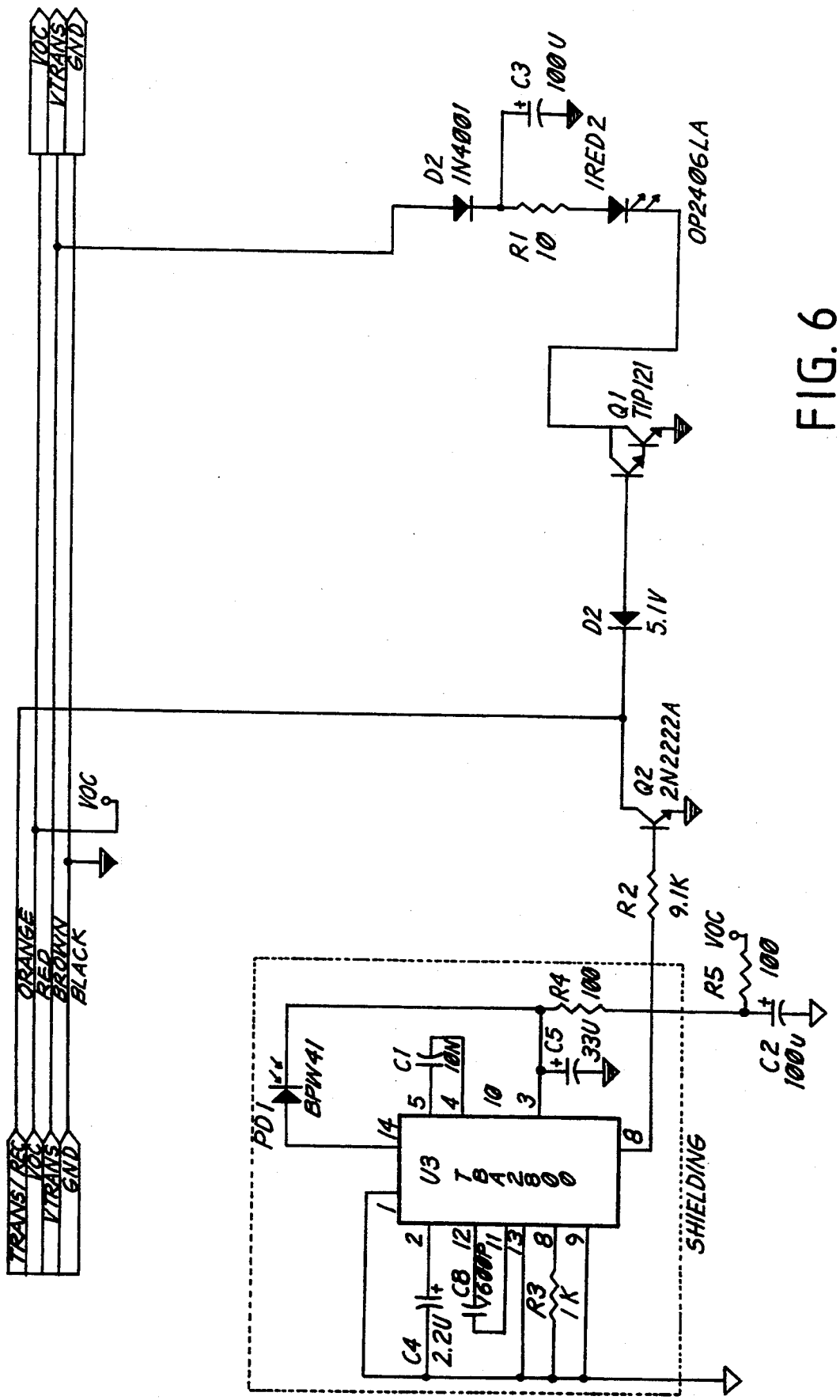

A more specific embodiment of the invention is described hereinafter with reference to FIGS. 5a, 5b and 6.

The embodiment in question has two kinds of control outputs: 8-bit parallel, to control video computer games, and serial, to control musical instruments with MIDI protocol.

With reference to FIG. 2, the following components are used: lens 27, focal length 5 cm; lenses 20 and 32, cylindrical, focal length 1.5 cm; and mirrors 22 and 25, front-coated aluminum.

The emitter is placed in the focus of the emitter assembly and the sensor is placed in the focus of the sensor assembly. The lens 32 is placed empirically in order to achieve the desired sensing beam, preferably between 0.5 cm and 1.5 cm from the sensor.

The zeroing procedure previously described has been applied to the apparatus in various rooms, and it has been found that the values NN=10 and SN=5 are optimal values for most environments. In a room with a 2.5 m white ceiling the following values were found: SDT=5 and IDN=30. All the remaining parameters were calculated using the values of NN and SN. The operating height achieved was 1.2 m for a standard dynamic stimuli object equivalent to a child's hand. The aforesaid results are for the worst segment. In a room with a 2 m white ceiling the following values were found: SDT=8 and IDN=34. The operating height achieved was 1 m using the same standard dynamic stimuli object.

Further illustration lists of electronic components conveniently usable for the control circuit and the panel circuit of FIGS. 5a, 5b and 6 will be described below.

The panel circuit and control circuit are related to the elements of the block diagram of FIG. 4 as follows: The emitter circuit of FIG. 4 includes elements D2, Q1, IRED1, R2, C3, and D1. The remaining components of the panel circuit are included in the sensor circuit.

Figure 4:
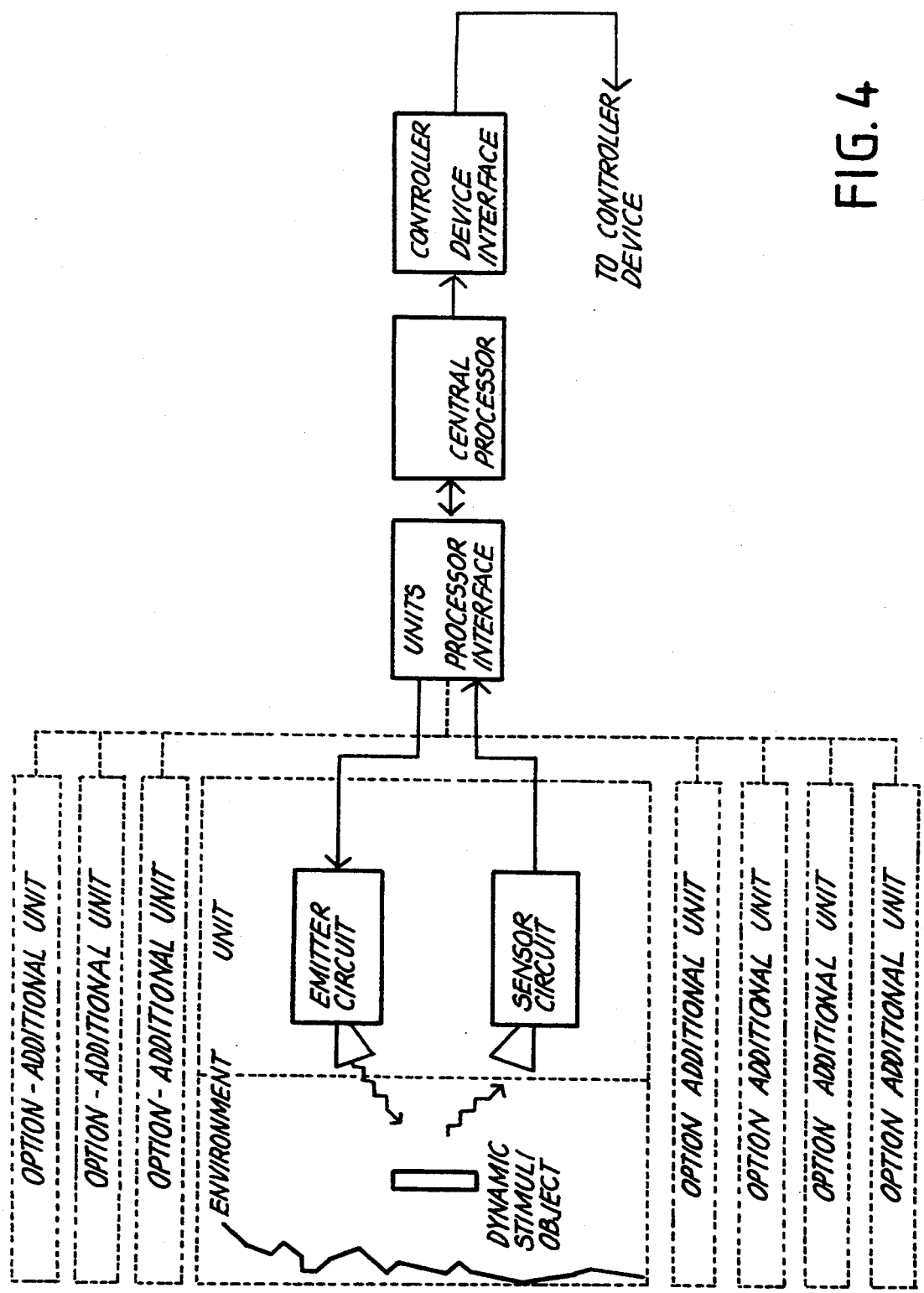
FIG. 4 is a block diagram schematically illustrating the relationship between the units, the central processor, and the interface to the game or instrument, and the flow and processing of information.

Elements J2, U2, DZ1, R6, R5, R4, R3, R2, Q1 and Q2 of the control circuit form part of the units processor interface of FIG. 4. Elements U1, X1, C1, C2, C3 and R1 of the control circuit form part of the center processor of FIG. 4. Elements U3 and J4 for operating a computer device, and U1 serial output (pin 10) and J3 for operating an MIDI device which are in the control circuit, form part of the controller device interface of FIG. 4.

BILL OF ELECTRONIC COMPONENTS CONTROL CIRCUIT

1. Semiconductors

| Item | Quantity | Reference | Characteristics | Recommended Part |
|---|---|---|---|---|
| 1 | 1 | U1 | Microcontroller *4KBYTE ROM 1 usec cycle 6 I/O bits for panel control serial port for MIDI 8 I/O bits for **external service | 8051 |
| 2 | 1 | U2 | 8 line Analog Multiplexer | 4051 |
| 3 | 1 | U3 | latch/buffer for **external device | 74373 |
| 4 | 1 | U4 | voltage regulator 7.5 V 100 mAmp | LM3171 |
| 5 | 1 | U5 | voltage regulator 5V 100 mAmp | IM78L05 |
| 6 | 2 | Q1,Q2 | small signal low frequency switching transistor VCE = 10 V IC = 50 mAmps NPN | 2N2222 |
| 7 | 1 | Q2 | small signal low frequency switching transistor VCE = 10 V IC = 50 mAmps PNP | 2N2907 |
| 8 | 1 | DZ1 | Zener diode 4.9 V 0.25 W | |
| 9 | 1 | LED1 | visible LED 50 mAmps | |
| 10 | 1 | X1 | crystal 12 MHz | |

*Required for complex configuration. 2 Kbytes sufficient for basic configuration.
** Required only if external device control operational.

2. Capacitors

| Item | Quantity | Reference | Characteristics | Recommended Part |
|---|---|---|---|---|
| 11 | 3 | C6, C7,C8 | IC'S decoupling caps 10 NF | |
| 12 | 2 | C1,C2 | 30 PF | |
| 13 | 1 | C3 | power on reset 10 UF/10 V | |
| 14 | 1 | C4 | regulator decoupling cap 2.2 UF | |
| 15 | 1 | C5 | regulator decoupling cap 2.2 UF | |

3. Resistors

| Item | Quantity | Reference | Characteristics | Recommended Part |
|---|---|---|---|---|
| 16 | 2 | R1,R3 | 1K | 0.25 W |
| 17 | 2 | R2,R7 | 10K | 0.25 W |
| 18 | 2 | R8,R4 | 200 | 0.25 W |
| 19 | 1 | R5 | 2K | 0.25 W |
| 20 | 1 | R6 | 100 | 0.25 W |
| 21 | 1 | R9 | 560 | 0.25 W |
| 22 | 1 | R10 | 2.7K | 0.25 W |

4. Connectors

| Item | Quantity | Reference | Characteristics | Recommended Part |
|---|---|---|---|---|
| 23 | 1 | J1 | power input 2 pin 10 V 0.3 Amps | |
| 24 | 1 | J3 | MIDI output 3 pin 5 V low current | |
| 25 | 1 | J4 | *external device output 9 pin 5 V low current | |

*Required only if external device control operational.

BILL OF ELECTRONIC COMPONENTS PANEL CIRCUIT

1. Semiconductors

| Item | Quantity | Reference | Characteristics | Recommended Part |
|---|---|---|---|---|
| 1 | 1 | U1 | IR preamplifier 70 DB gain | TBA2800 |
| 2 | 1 | IRED1 | near IR radiation 3 Amps peak current at 1 usec 300 pps 100 mW power dissipation wavelength matches IRED1 | OP240A (Optek) |
| 3 | 1 | PD1 | NEP = 3.7E-14 [Watt/Sqrt (HZ)] | SFH205 (Seimens) |
| 4 | 1 | Q1 | VCC = 10 V 3 Amps peak current at 1 usec 300 pps 100 mW power dissipation HFE = 200 | |
| 5 | 1 | Q2 | small signal switching transistor VCC = 10 V IC = 50 mAmps | 2N2222 |
| 6 | 1 | D1 | rectifying diode 100 mAmps 10 V | IN4001 |
| 7 | 1 | DZ1 | Zener diode 5.1 V 0.25 W | |

2. Capacitors

| Item | Quantity | Reference | Characteristics | Recommended Part |
|---|---|---|---|---|
| 8 | 1 | C1 | 10 N/10 V | |
| 9 | 2 | C2,C3 | 100 U/6 V | |
| 10 | 1 | C4 | 2.2 U/6 V | |
| 11 | 1 | C5 | 33 U/6 V | |
| 12 | 1 | C6 | 1.5 N/ 6 V | |

3. Resistors

| Item | Quantity | Reference | Characteristics | Recommended Part |
|---|---|---|---|---|
| 13 | 1 | R1 | 10 | 0.25 W |
| 14 | 1 | R2 | 10K | 0.25 W |
| 15 | 1 | R3 | 1K | 0.25 W |
| 16 | 2 | R4,R5 | 100 | 0.25 W | the invention is particularly applicable to the control of musical instruments or computer-operated visual games, it is applicable to the control of different apparatuses. For instance, it can be used as a safety device to prevent or discontinue operation of a machine, an elevator or the like, whenever a part of the body of a player or any other person is located where it could be endangered by the operation of the machine. In this case, the presence of such a part of the body of a person constitutes the dynamic stimulus which activates the apparatus according to the invention, and the zeroing operation is conducted taking into account the nature of dynamic stimulus.

Figure 7:
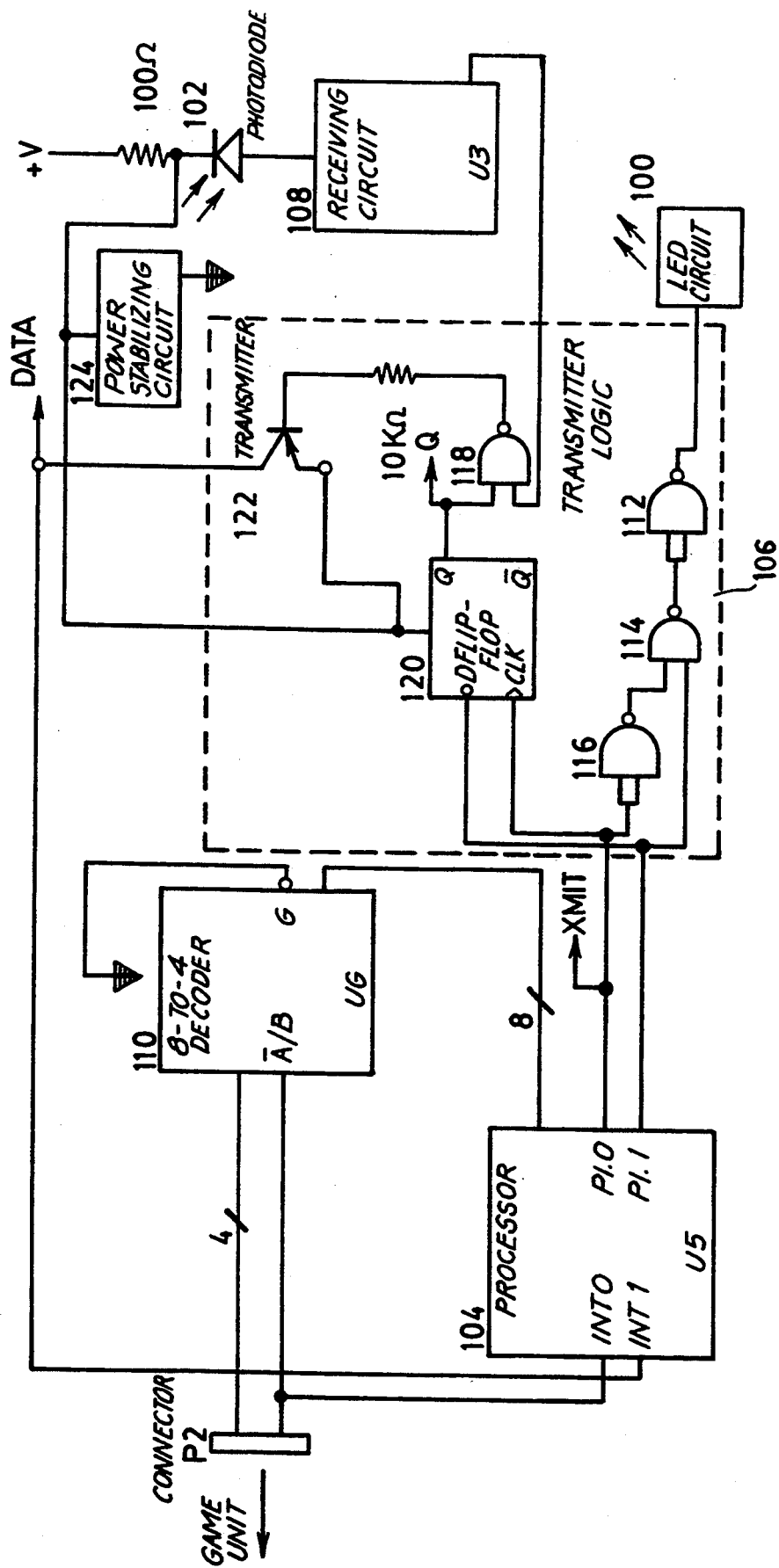
FIG. 7 is a schematic diagram of a panel circuit for another embodiment of the invention.

Another embodiment of the present invention is disclosed in FIGS. 7-10. This embodiment is particularly adapted to address the needs of video computer games, such as the Sega Genesis System. Again, a plurality of individual panels, each having an individual emitting LED circuit 100, for example, in the infrared range, and an individual sensor member or photodiode 102 is provided. FIG. 7 discloses the schematic circuitry for one slave panel 134, which is responsive to a microprocessor unit 104 contained within a master panel member 132. The master panel member 132 contains a stored program having appropriate algorithms to process information from the respective slave panels 134 to enable a player to control a video game.

Figure 9:
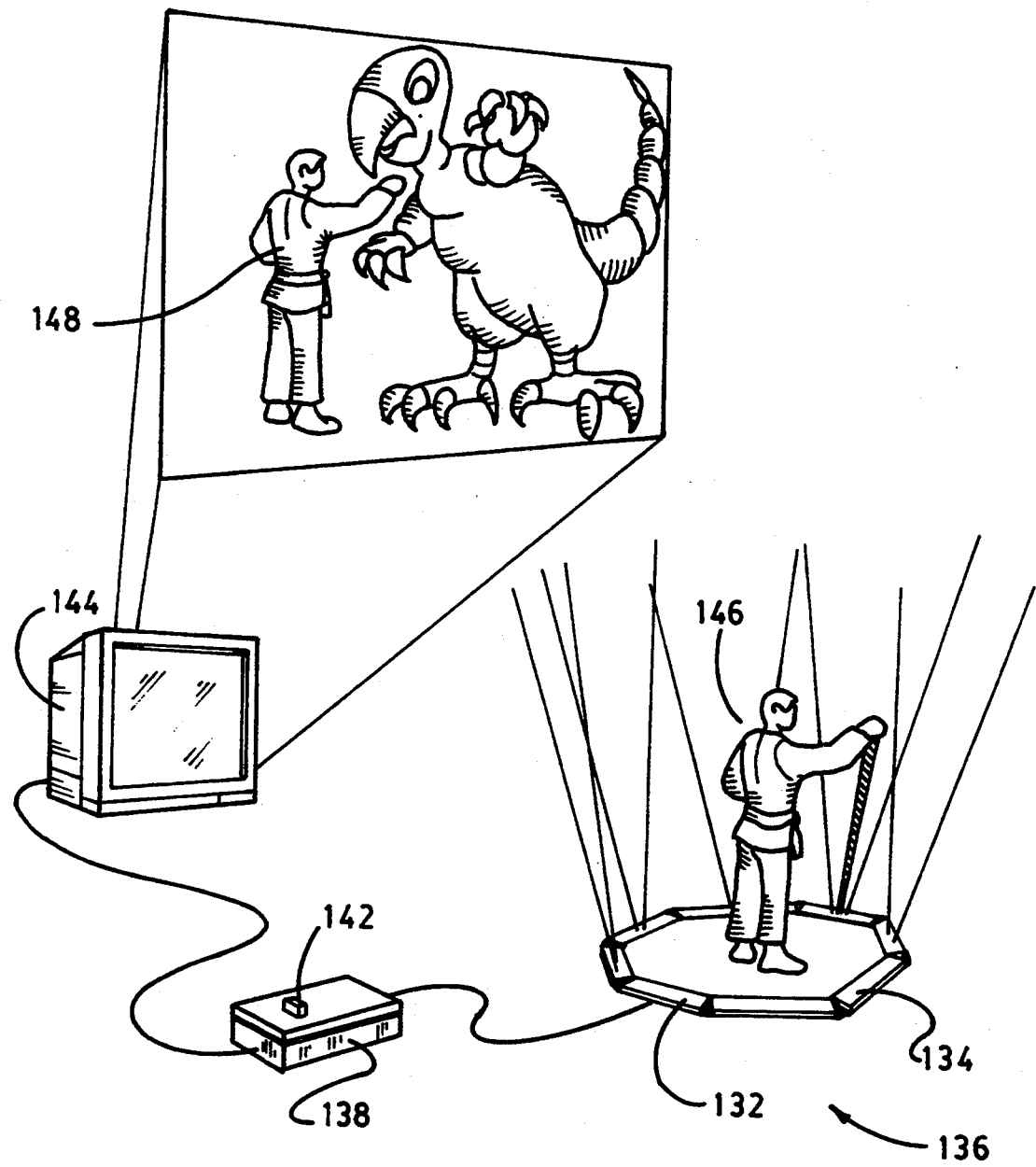
FIG. 9 is a perspective illustrative view of a video game operation.
Figure 10:
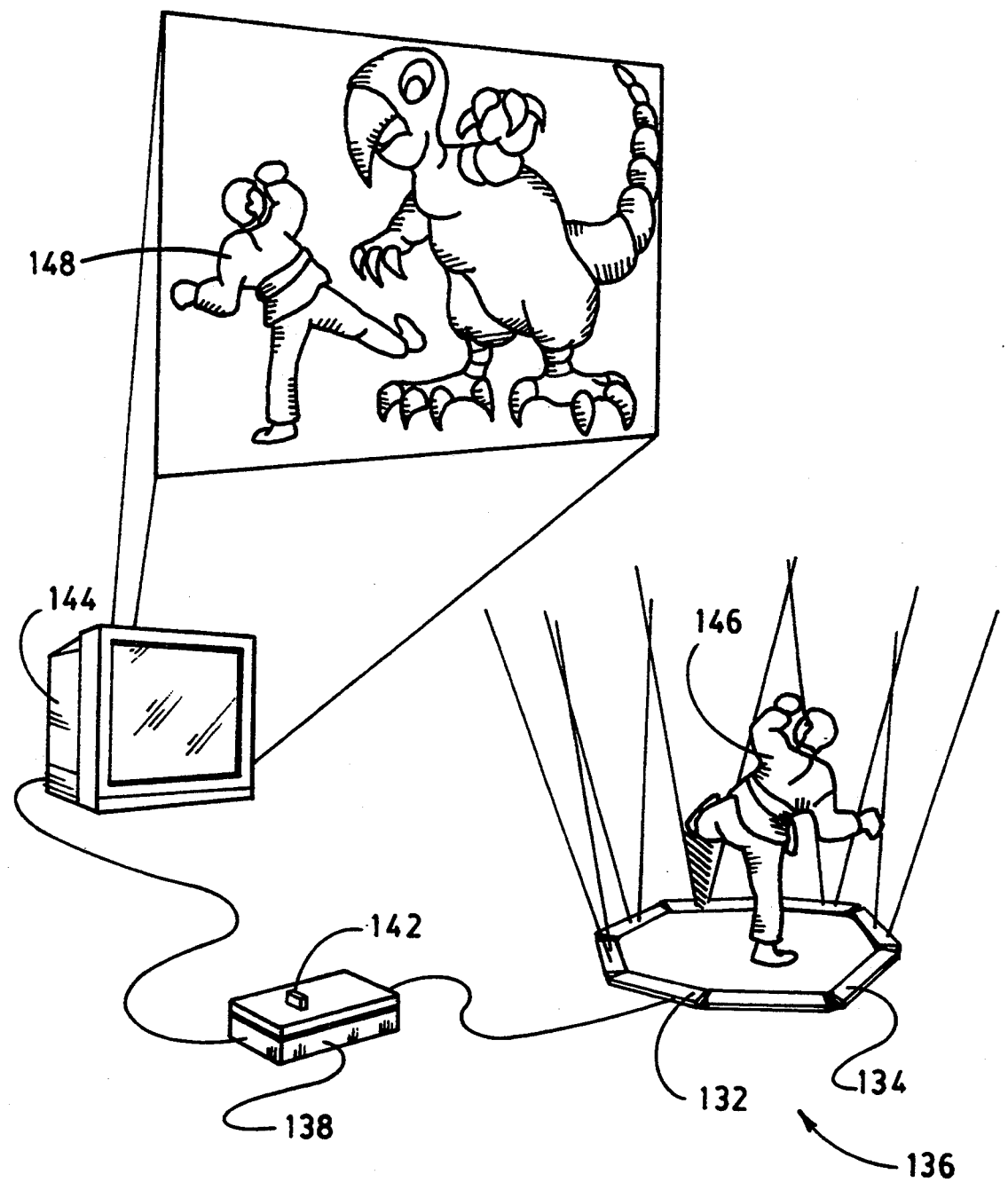
FIG. 10 is another perspective illustrative view of a video game operation.

As seen in FIGS. 9 and 10, an illustration of the interface of a player with an optical controller 136 of this embodiment is disclosed. The optical controller 136 is connected to a video game processing unit 140, which is only schematically shown and can constitute a commercial product such as the Sega Genesis Video Game System. Game cartridges 142 can store game instructions on a ROM, as known in the industry, for projecting video signals that can be controlled with a player interface onto a video monitor or television display 144. For ease of illustration the video display is exaggerated in FIGS. 9 and 10.

As can be readily appreciated, video game processing units 140 are capable of using other than a ROM cartridge 142 for the storage of games, such as a CD disk, which has the capability of providing a greater storage capacity and more intricate game play and images. In a conventional video game processing unit 140, a hand-held controller (not shown) having generally eight functional control switches has been utilized for controlling an interaction between the player and the progress of the game displayed on the television screen 144.

Numerous attempts have been provided to simplify such a hand-held controller to facilitate the ability of the player to enjoy the game. The optical controller 136 of the present invention has the capacity, in this particular embodiment, to provide 16 control switching functions, since each one of the panel units that make up the optical controller 136 can distinguish between the position of a hand, as shown in FIG. 9, for a player 146, and the position of a foot, as shown in FIG. 10. Thus, the present invention not only encourages the player to create a feeling of identity and simulation with a corresponding video character 148, but further enables the player to naturally take advantage of the increased 16-function control switching capacities of the optical controller 136 without being encumbered by holding a hand controller of the conventional configuration. The player 146, when stepping within the surrounding radiation shield collectively provided by the individual panel units, can become immersed in playing the game, since his hand and foot movements will appear by themselves to be directly translated into the simulated movements of the video character 148. Since the radiation shield can be formed of an infrared energy, the only apparent interaction with the radiation shield will be the corresponding simulated movement of the video character 148.

As can be readily appreciated, the optical controller 136 of the present invention is highly advantageous with boxing, martial arts, and other sport action games. The optical controller 136, however, having a larger number of control functions than the manual switches of the conventional hand controller, is also capable of not only simulating the hand controller so that a particular panel and a particular high or low position on the panel, can each correspond to the conventional controller hand button, but further, the remaining additional switching functions of the panel units can enable the optical controller 136 to provide alternative control functions. For example, if one button of a conventional controller is dedicated to be a firing button for a particular action video game, that control function can be emulated by one of the panel units of the optical controller 136. Another panel unit, however, or a high or corresponding low position on the same panel, can provide an enhanced firing capability, for example, for a rapid fire capability that would be incapable of being accomplished by the manual manipulation of the conventional hand controller button. The processor 104 in the master panel 132 can, for example, when sensing the activation of the enhanced panel functioning switch, pulse the firing signals on the conventional communication line to the video game processing unit at a much higher frequency to create a machine gun-like firing capacity. This enhanced game functioning play can, of course, be accomplished without any apparent player manipulation of a mechanical control feature on a controller. The player simply uses the dynamic stimulus of his own body in interfacing with a radiation emission space above the particular panel unit.

The processor 104 can be programmed to interface with games (or other devices) that are not designed to utilize all 16 functional control signals (assuming a hexagonal panel configuration) of the output signals. For example, a standard Genesis game cartridge accepts eight functional input control signals from a conventional hand controller (not shown); however, the optical controller 136 is able to provide at least twice that many. The optical controller 136 can recognize, by polling the appropriate addresses of the game data stored in the game medium, when a standard Genesis game is interfaced therewith, and its processor 104 can switch to a protocol designed to accommodate the interface's limitations.

By multiplexing the optical controller 136 outputs through the 8-to-4 decoder 110, the processor 104 enables an attached standard Genesis game to further utilize the capabilities of the optical controller 136 when the player activates the game inputs in a particular manner recognizable to the optical controller 136 via its programming. For example, a player's activation of one panel with his hand, while simultaneously activating another panel with his foot, might cause the data normally present on a first data line to be replaced with data present on a ninth data line.

As an example, a first data line could provide a firing control signal limited by the manual depressing of a button on a conventional controller, while the ninth data line would provide firing control signals at a high repetition rate to create a machine gun firing action which would constitute enhanced play action.

Referring to FIG. 7, the processor chip 104 can first initialize the variables utilized in its computations. As described earlier, various thresholds can be set and are updated depending upon the reflective characteristics of the room within which the optical controller is to be operated. In this embodiment, a single emitter such as that which is contained within LED circuit 100 is mounted on each of the individual panels, and a single sensor member or photodiode 102 will sense the reflected radiation from the position of a player appendage such as the hand/arm or foot/leg of the player 146. The optical system, shown in FIG. 2, complementing the emission of the radiation from LED circuit 100 will spread the emitted radiation into an elongated emission space above the specific panel unit so that the radiation in one lateral direction will be simultaneously spread to a lesser degree than in a radial direction to provide a truncated emission space. Since this radiation is being simultaneously emitted throughout this space, when a hand, as shown in FIG. 9, is inserted into this radiation space, the amount of energy reflected back to the sensor member 102 will be a function of the relative height of the appendage from the emitting source of radiation. The position of an appendage such as a foot or leg at a lower height will reflect a larger percentage of radiation back to the sensor member 102. Since it is assumed that the player 146 will operate the game while standing in an upright position, an empirical determination of a threshold value of radiation received by the sensor can be utilized to determine whether or not the appendage inserted by the player 146 is, in fact, a hand/arm or a foot/leg. Thus, a determination can be made of the relative position of the appendage or object in the emission space, depending upon the quantity of radiation that is received by the sensor member 102.

Thus, the intensity of the light received by a panel's photodiode sensing member 102 during a predetermined time interval is indicative of whether or not a hand/arm or foot/leg has been inserted within the optical path of the radiation space corresponding to that particular panel. The processor 104 in the master panel 132 can cause a sequential scanning of each of the slave panels 134 to determine the status of each panel unit. It should be noted that each of the emitter members on each panel unit is not fired simultaneously, but is sequentially fired to prevent erroneous radiation from being received by other sensor members of the other panel units. This permits each panel unit to have identical emitter and sensor components.

The status of each panel unit is determined by comparing values corresponding to the intensity of the light received by each panel (hereinafter COUNTER_HX represents this value) with the following thresholds: OFF$_{13}$ LEVEL, ON_LEVEL, and LOW_LEVEL.

If COUNTER_HX<OFF_LEVEL, then the panel unit enters into "Operate Panel Off" mode. If OFF_LEVEL<COUNTER_HX<ON_LEVEL, there is no change in the operation mode. If COUNTER_HX>ON_LEVEL, then the panel unit enters into "Operate Panel On" mode. Similarly, if COUNTER_HX>LOW_LEVEL, then the panel unit enters into "Operate Panel Low" mode.

The aforementioned processor 104, referred to in FIG. 7 as U5, enables the electronics' transmitter logic 106, thereby firing the panel's LED circuit 100, enabling the receiver circuitry 108, and setting up the next panel unit. FIG. 7 illustrates a preferred embodiment of transmitter logic 106 consisting of NAND gates 112, 114, 116, and 118, D flip-flop 120, and transistor 122. Additionally, power stabilizing circuit 124 is shown connected to D flip-flop 120 and photodiode 102.

A signal corresponding to the intensity of the light emitted from LED circuit 100 and received by photodiode 102 is output by photodiode 102 to receiving circuit 108. Receiving circuit 108 may be a TBA 2800 infrared preamplifier chip made by ITT or a similar device that is capable of outputting pulses varying in width, wherein such variance is indicative of the magnitude or intensity of radiation of signals received by the receiving circuit 108 over a predetermined time interval. Variations in the aforementioned pulse width convey information which can be utilized by the processor 104 to identify the object which has traversed the optical path between LED circuit 100 and photodiode 102. This can be accomplished by empirically identifying an intensity level which can be used for comparison purposes to distinguish between an object in an upper space of a panel radiation space (e.g., hand/arm) and a lower space (e.g., foot/leg).

The pulses output from receiving circuit 108 further provide an input to NAND gate 118 within transmitter logic 106. Processor 104, which, in a preferred embodiment, may be an Intel 8051 chip, provides outputs P1.0 and P1.1 to transmitter logic 106 and receives an interrupt signal INT1 therefrom. More specifically, output P1.0 is provided to NAND gate 116 as an input and to D flip-flop 120 as a clock. Processor 104's output P1.1 is provided as an input to D flip-flop 120 and as an input to NAND gate 114.

When signal P11 goes "high" the transmitter logic is enabled. NAND gate 118 receives the Q output of D flip-flop 120 and the aforementioned output signal from receiving circuit 108 and provides an input to transistor 122. The output of transistor 122 is connected to the DATA line and output to processor 104 as an interrupt signal INT1. This interrupt indicates that the receiver circuit 108 has received LED circuit 100's light emission and that receiver circuit 108 has output information corresponding thereto in the form of a pulse. When processor 104 receives interrupt signal INT1, the appropriate counters are reset prior to firing the next panel's LED circuit 100.

LED circuit 100 includes firing circuitry which is connected to the output of NAND gate 112 of transmitter logic 106. NAND gate 112 fires LED circuit 100 in response to processor 104's outputs P1.0 and P1.1, as is illustrated in FIG. 7.

Processor 104 interfaces with the video game processing unit 138 via an 8-to-4 decoder 110 which acts as a multiplexer. The game processing unit 138, via connector P2, sends a signal INT0 to 8-to-4 decoder 110 to indicate which data the game processing unit 138 is ready to receive from processor 104.

Figure 8:
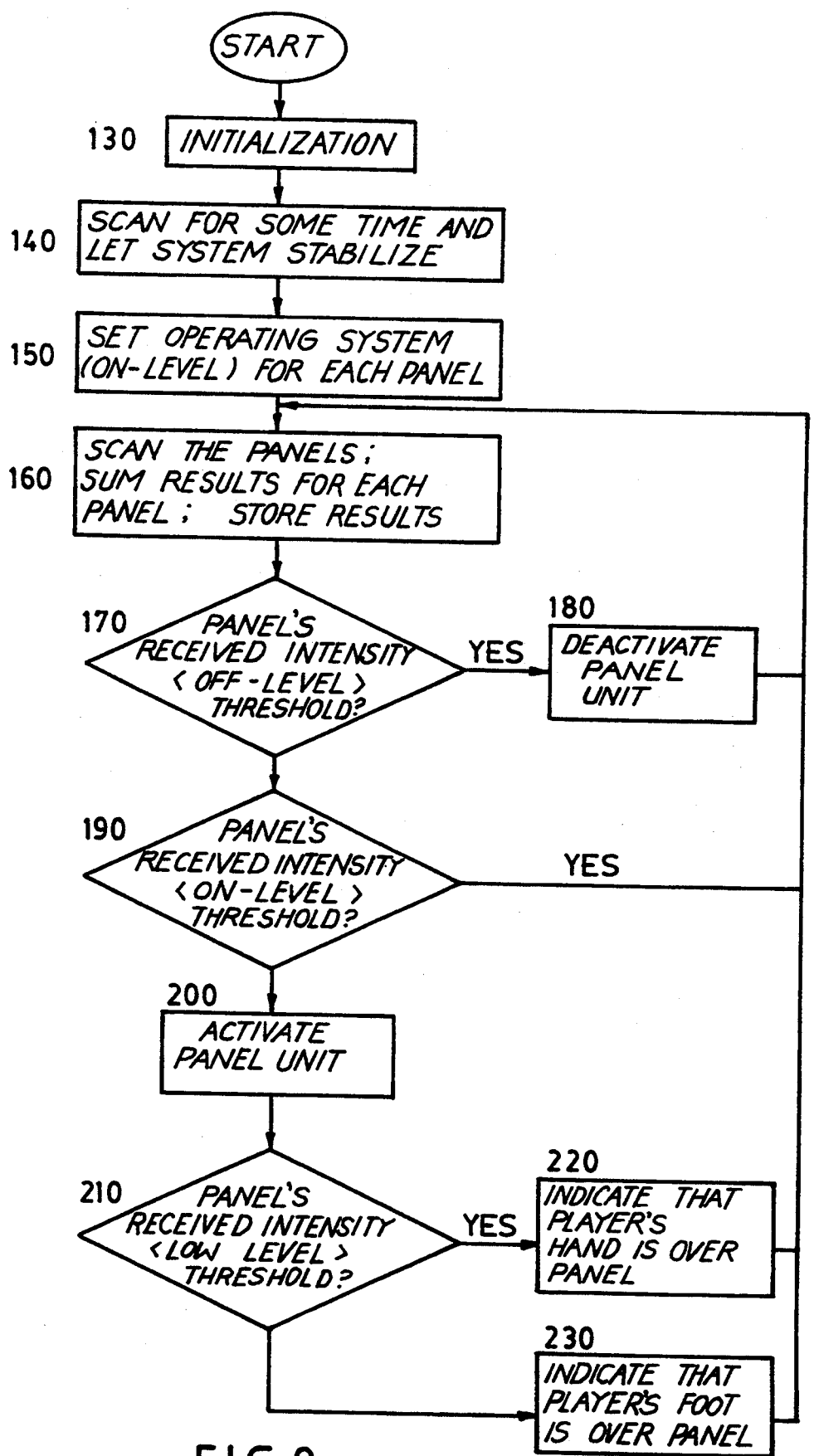
FIG. 8 is a flow chart of a calibration and operator-sensing mode of operation.

FIG. 8 is a flow chart representation of the algorithms executed by processor 104. After power is initially applied to processor 104, initialization 130 of processor 104's variables is automatically performed. Thereafter, processor 104 enters into loop 140 (the second step of processor's 104 autozeroing routine) wherein processor 104 scans the panels until it has determined that the system is stabilized.

The final portion of the aforementioned autozeroing routine consists of step 150 wherein a variable (e.g., ON_LEVEL) for each panel is set to an operating reference level, the determination of which depends upon the ambient conditions within which the system is being operated.

FIG. 8, in step 160, further shows how processor 104 differentiates between a player's hand and foot by scanning the panels, summing the results of the scanning over a predetermined time interval, and storing the results thereof. In a preferred embodiment, the aforementioned stored values are indicative of the amount of light intensity reflected back toward and received by each panel. Such values necessarily fall within numerical regions defined by threshold values stored within processor 104.

Steps 170 and 180 illustrate that processor 104 responds to a level of received light falling below an OFF$_{13}$ LEVEL threshold by deactivating the game panel. When there is no interference with the optical path between LED circuit 100 and photodiode 102, the reflected level of light falls below the OFF_LEVEL threshold when the system is properly calibrated.

If the intensity of light received by a panel exceeds the aforementioned OFF_LEVEL threshold and is below another threshold called the ON_LEVEL threshold, the system deems the received light to be within the boundary of a noise band defined by these two thresholds. When the received intensity level is as described immediately above, step 190 shows that processor 104 does not change the operational status of the system in response to what is categorized as mere noise.

However, when the reflected and thereafter received light is of an intensity which is above the ON_LEVEL threshold, steps 190 and 200 illustrate that processor 104 activates the game panel in response thereto. The level of received light is higher because either the player's hand or foot has interfered with the optical path between LED circuit 100 and photodiode 102. Step 210 shows how the processor 104 utilizes an additional threshold, LOW_LEVEL threshold, to distinguish between the player's hand/arm and foot/leg.

A greater amount of light is typically reflected back toward the panel when the player's foot crosses the optical path than when the player's hand crosses therethrough because of the relative vertical position to the emitter member 100 (see FIG. 10). Accordingly, and as illustrated by steps 210, 220, and 230, the amount of light received by the panel when this stage of the processing algorithm is reached will necessarily fall above or below the LOW_LEVEL threshold. When the amount of light received falls below the LOW_LEVEL threshold, step 220 shows that processor 104 thereafter determines that the player's hand is over the panel. Conversely, when the amount of light received is above the low-level threshold, step 230 shows that processor 104 thereafter determines that the player's foot is over the panel.

Figure 11:
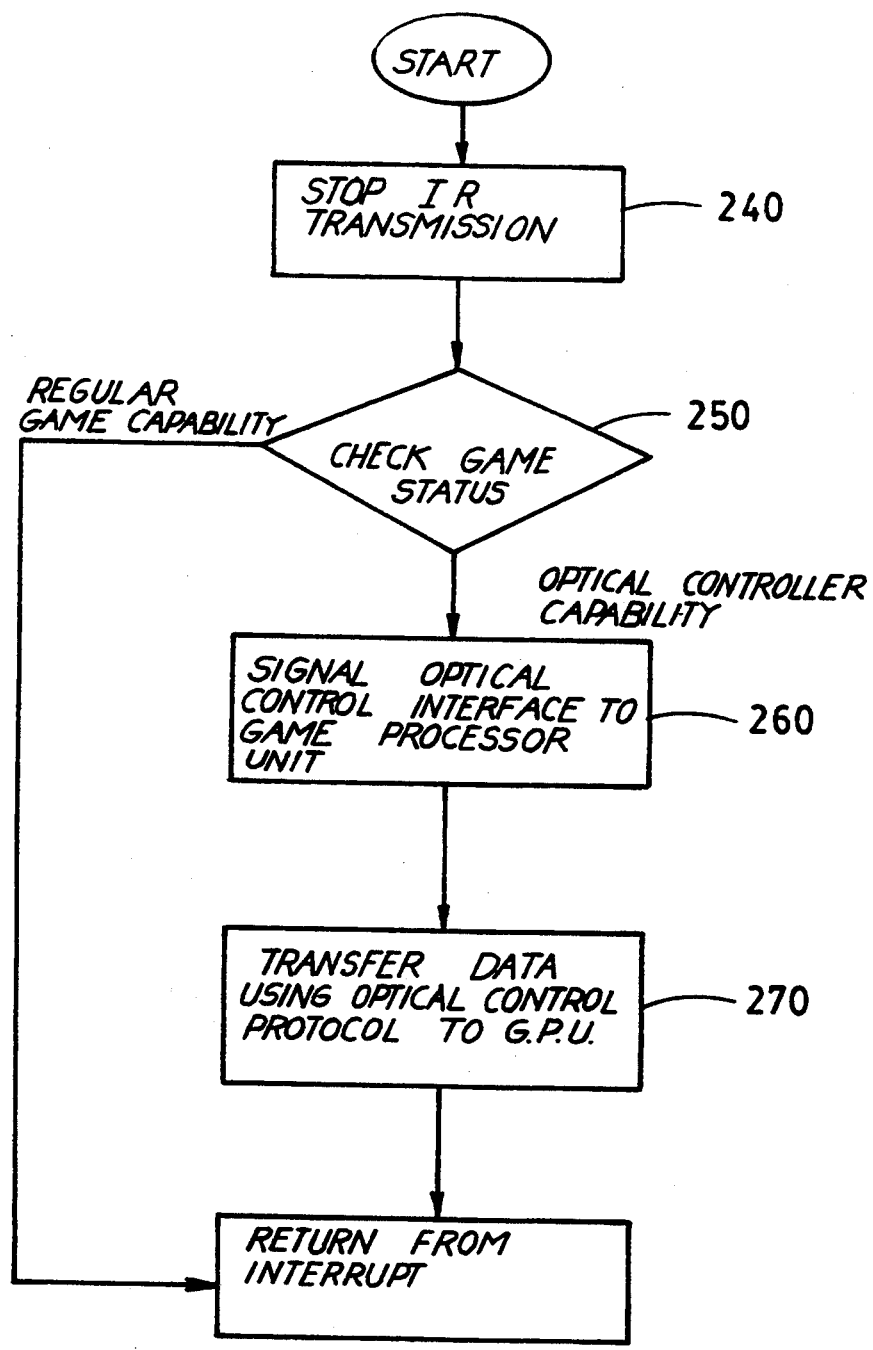
FIG. 11 is a diagram of a program flow chart.

FIG. 11 discloses schematic program steps for a game processor unit (GPU) interrupt. Step 240 indicates that any panel unit transmission of IR will be stopped in order to prevent a power overload on any individual panel unit LED circuit 100. Step 250 is a decisional step to check the game status and, more particularly, to determine if an ordinary or regular game cartridge or game data has been inserted into the game processing unit 138, or whether game data capable of utilizing the full functions of the optical controller 136 capability has been inserted. The optical controller 136 is designed to emulate a regular hand controller by default. Accordingly, if the decision at step 250 is that a regular game capability is indicated on one of the communication lines from the game processor unit 138, then the optical controller 136 will function to emulate a standard hand controller. Alternatively, if an optical controller capability is indicated, then at step 260 a signal will be generated to indicate an optical controller interface with the game processor unit 138. At step 270, data will be transferred, that is functional control signals, using an optical controller protocol to the GPU.

Figure 12:
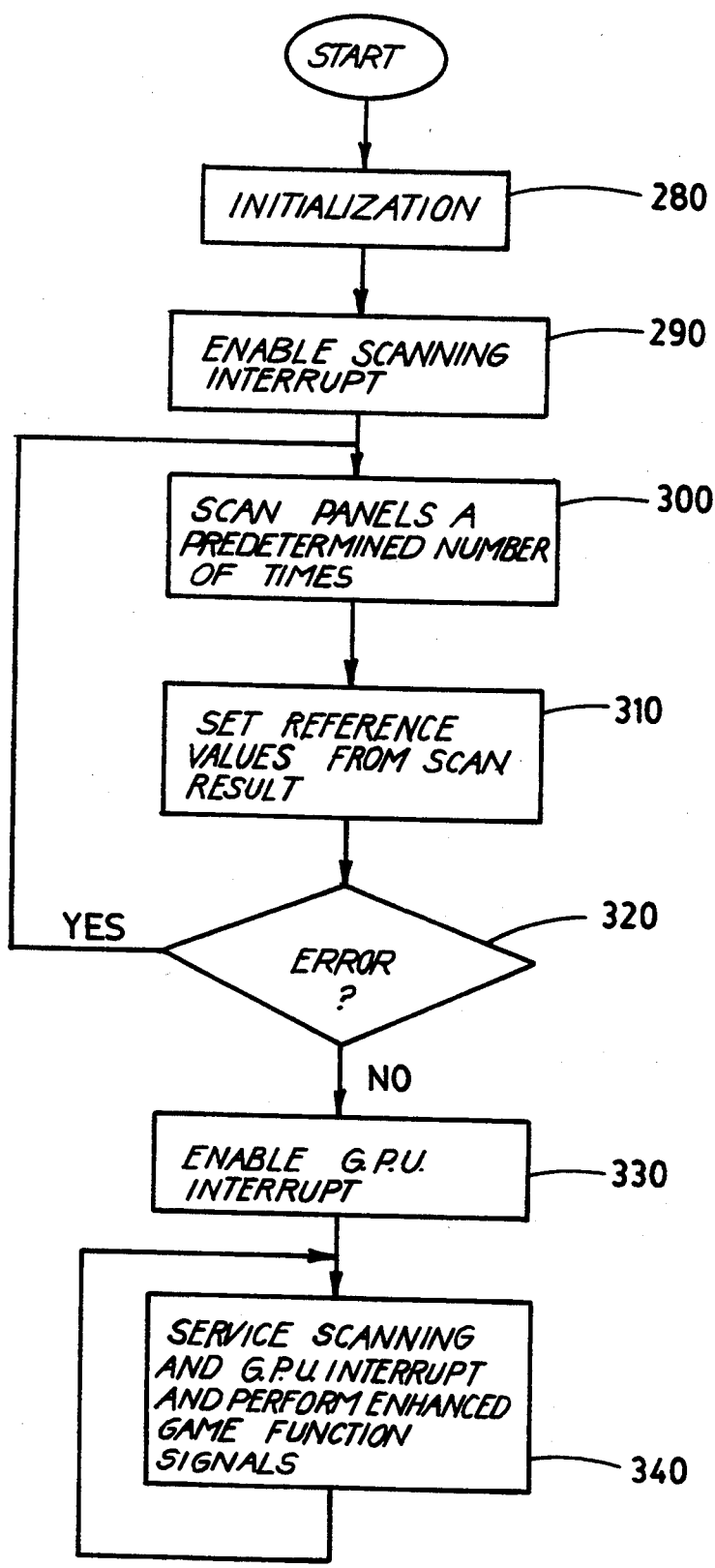
FIG. 12 is a diagram of a program flow chart.

An additional flow chart is shown in FIG. 12 to broadly describe a program for controlling the optical controller 136. An initiation step takes place at step 280, followed by a step of enabling the scanning interrupt at step 290. At step 300, a predetermined scan cycle of the panel units is instigated to provide measurement data to permit, at step 310, the setting of operating reference values. If an error is detected at step 320; for example, if the optical controller 136 detects abnormally high intensity reflections in one of the panels during the determination of the operating threshold values, the procedure of steps 300 and 310 are repeated. Subsequently, the game processing unit interrupts are enabled at step 330. At step 340 the program can service both the operational scanning to determine the input of control signals, and the GPU interrupts and, in addition, can perform enhanced power functions. As can be appreciated, the enhanced-power functions described above are performed by the optical controller, and the game will accept those signals in the ordinary play of the game.

Figure 13:
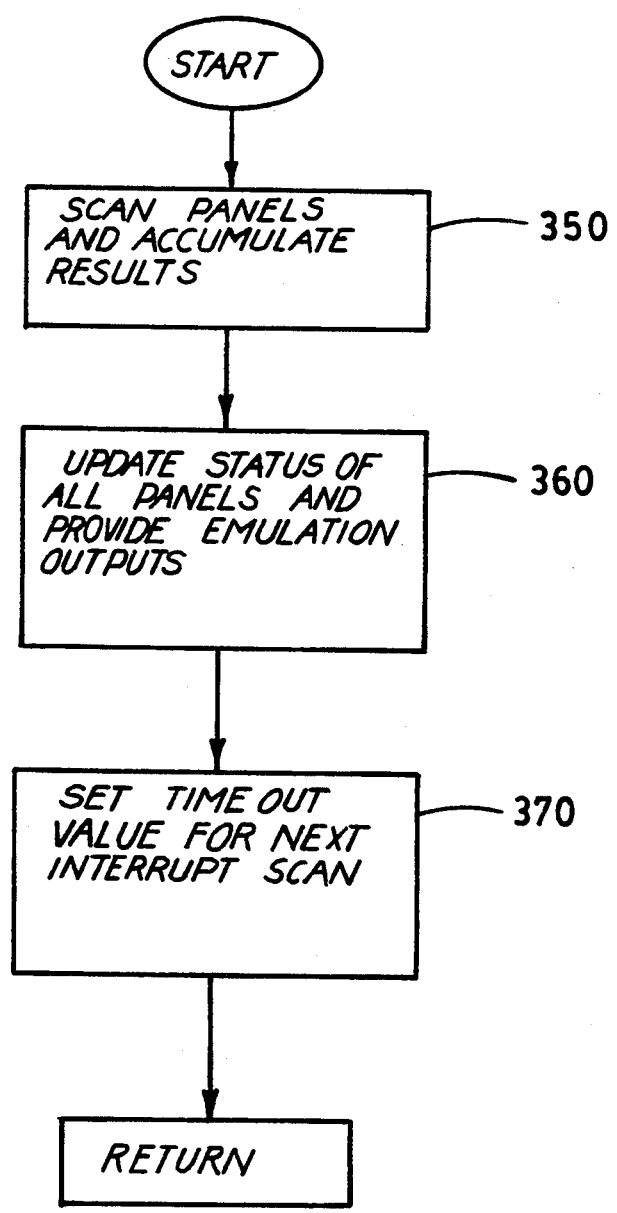
FIG. 13 is a diagram of a program flow chart.

Referring to FIG. 13, a simplified flow chart of the scanning interrupt is disclosed. At step 350 the panels are scanned and the radiation that has been sensed as output signals is accumulated. At step 360 there is an updating of the entire panel status, and there is an output of the emulation results to the GPU. Finally, at step 370 the program sets the timeout value for the next interrupt scan.

Figure 14:
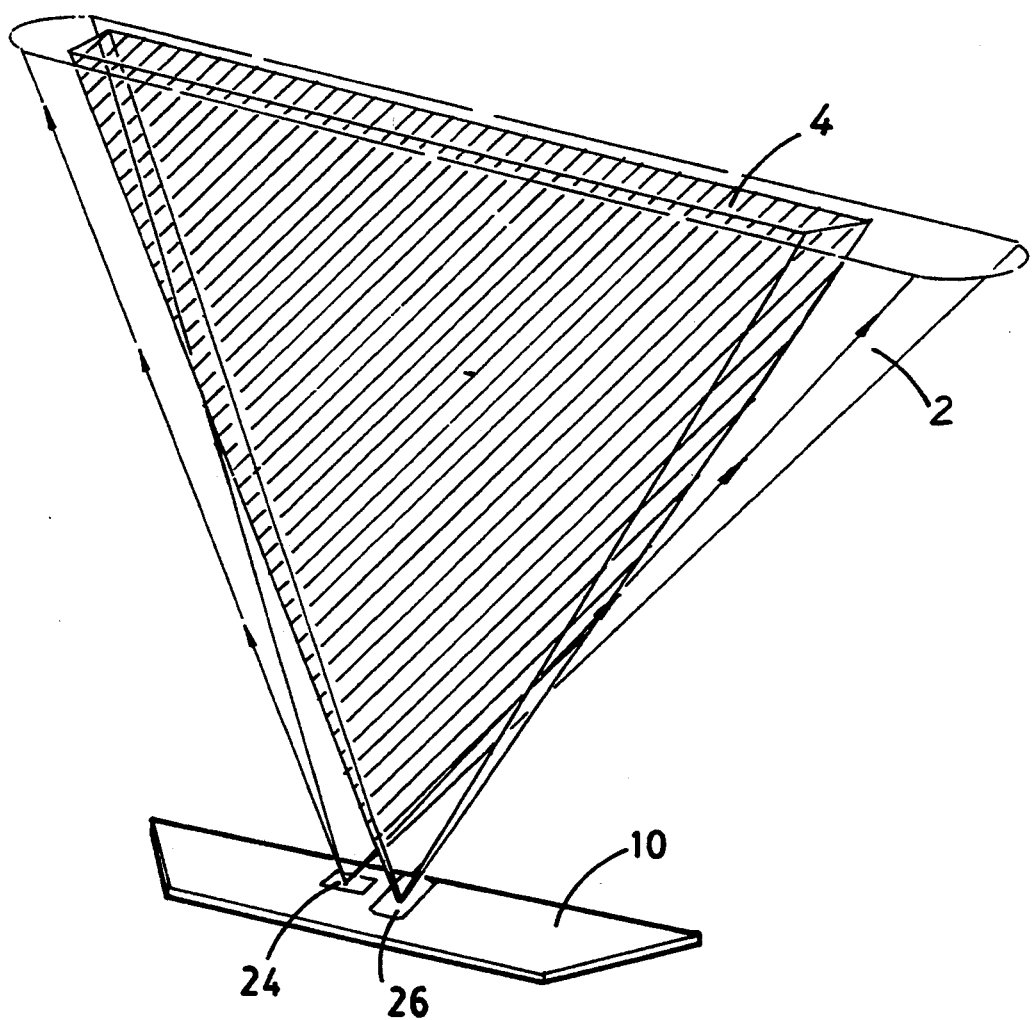
FIG. 14 is a perspective view of an emitted radiation beam and a sensing beam above a representative panel of the controller.

Referring to FIG. 14, the radiation beam or emission space 2 transmitted through window 24 of a representative panel or segment 10 is shaped, principally by optical lens 20, to have a screen-like volume having a cross-sectional thickness (into the plane of the drawing) which is much less than its cross-sectional width (extending left to right in the drawing), thereby imparting a generally thin, curtain-like appearance to the emission space 2. At the same time, the sensing beam or space 4 (also known as the field-of-view of the sensor) that passes through the window 26 on the segment 10 is shaped, principally by optical lenses 27, 32, to have a screen-like volume, also having a cross-sectional thickness much less than its cross-sectional width. FIG. 14 shows that virtually all of the points in the sensing space 4 lie within the emission space 2. In a variant construction, the emission space could lie almost entirely within the sensing space. Although the emission and sensing spaces are shown as being substantially planar, in practice, each is curved and has a large radius of curvature.

Figure 16:
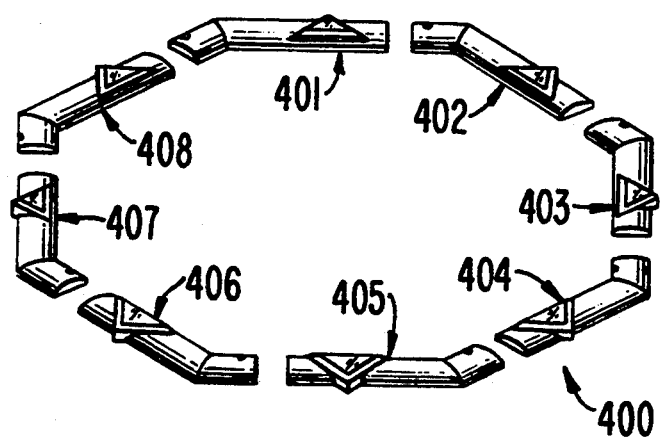
FIG. 16 is a perspective view of the embodiment of FIG. 15 in disassembled form.
Figure 15:
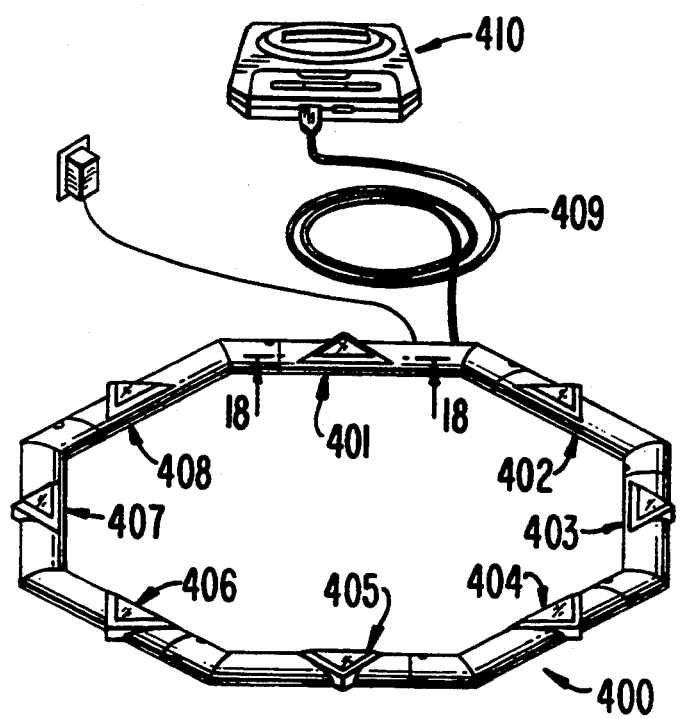
FIG. 15 is a perspective view of a commercial embodiment of a controller in accordance with this invention.

FIG. 15 depicts a commercial embodiment of an optical controller 400, analogous to the controller 136 of FIGS. 9 and 10, connected via a cable 409 to a video game processing unit 410 commercially available as the Sega Genesis Video Game System. The controller 400 includes a master panel 401 and seven slave panels 402, 403, 404, 405, 406, 407 and 408, shown in assembled view in FIG. 15, and in disassembled view in FIG. 16. In a variant construction, as shown in FIG. 17, two identical controllers 400 are connected to a pair of control ports on the game processing unit 410 to allow two players to compete. The controllers 400 are spaced apart, typically 3 to 5 feet, to prevent interference between the controllers and the players.

Turning to FIG. 18, the master panel 401 includes an upper housing 412 and a lower housing 414 in which the above discussed electronic circuitry is housed on one or more printed circuit boards, e.g., board 416. A light emitting diode 418 (analogous to diode 13) is mounted on board 416 and surrounded by a circular, rubber gasket 420 which, in the assembled state, is sealingly engaged by a light well 422 extending downwardly from the upper housing 412 in order to resist the escape of light past the gasket and to confine the light emitted by diode 418 in an outgoing path through a shaping lens 424 (analogous to lens 20) to generally configure the emission space 2 (see FIG. 14) to have the aforementioned, generally thin, screen-like volume.

Another shaping lens 426 (analogous to lenses 27 and 32) is mounted adjacent shaping lens 424 and is separated therefrom by a raised ridge 428. Shaping lens 426 configures the sensing space 4 (see FIG. 14) to have the aformentioned, generally thin, screen-like volume. Shaping lens 426 directs the returning light into another light-confining well 430 to a detector 432 (analogous to detector 14). Various electronic components, for example, a receiving circuit 434 (analogous to circuit 108), are mounted on the board 416 in a radio frequency shielding metal can 436 to resist the noise effects of stray electro-magnetic interference, and to assist in resisting ambient light from corrupting the returning light. The shaping lenses 424, 426 are preferably coated with a filtering material to allow only infrared light frequencies to pass therethrough. The raised ridge 428 also assists in blocking outgoing light from the emitter from passing directly to the detector.

A multi-conductor ribbon cable 438 conducts electrical signals from the components at one end of the master panel 401 to an electrical connector 440 to mate with a complementary connector 446 connected by another ribbon cable 444 to other components mounted on adjacent slave panel 408. The other end of the master panel 401 also has a connector to conduct signals to adjacent slave panel 402.

Each of the master and slave panels 401 to 408 has an emitter 418, sensor 432, board 416, and connectors, as described above, so that a plurality of emission spaces 2 and sensing spaces 4 are created as a curtain around a player. The master panel has, in addition, another circuit board on which the control components (see FIG. 5a) are mounted in order to control and communicate with all the slave panels.

Figure 20:
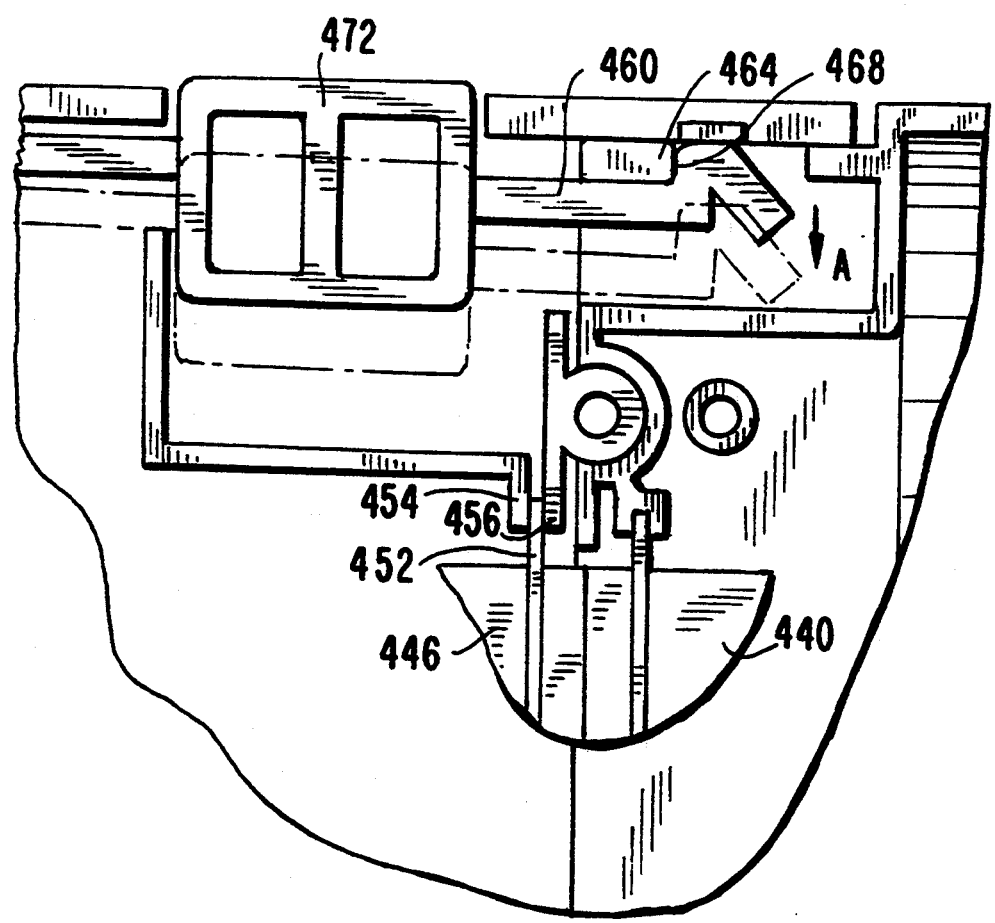
FIG. 20 is an enlarged, broken-away, bottom plan view taken on line 20—20 of FIG. 18.

The electro-mechanical connection between adjacent panels is best seen in FIGS. 19 and 20. The upper and lower housings of each panel has an elongated, main portion 448 and a leg portion 450 angularly inclined at an obtuse angle relative to the main portion. The ribbon cable 444 extends along leg portion 450 of slave panel 408 and terminates in the pin connector 446 which is held in place by an exterior flange 452 wedged into a channel bounded by opposed walls 454, 456. The ribbon cable 438 of master panel 401 terminates in the socket connector 440 for mating with the pin connector 446.

A latch at the leg portion includes a pair of resilient latch arms 460, 462 normally biased away from each other by their inherent resilience, and movable, by opposed finger pressure in the direction of the arrows A, towards each other to allow latch projections 464, 466 to pass by the arms 460, 462 and become engaged behind shoulders 468, 470 of the arms (see FIG. 20). To release the projections from the latched position shown in Figure 20, it is merely necessary to squeeze handles 472, 474 toward each other, thereby moving the arms 460, 462 closer together and freeing the projections 464, 466 from engagement with the shoulders 468, 470.

Turning to FIGS. 21 and 22, as previously noted in connection with FIG. 8, if the intensity of the received light is below the LOW LEVEL threshold, then the processor 104 determines that the player's hand is over the panel (see FIG. 9), and conversely if the intensity of the received light is above the LOW LEVEL threshold, then the processor 104 determines that the player's foot is over the panel (see FIG. 10). This LOW LEVEL threshold is adjustable between a minimum break level, e.g., 12" relative to the floor, as depicted in FIG. 21, and a maximum break level, e.g., 28" relative to the floor, as depicted in FIG. 22. The break level is advantageously set by the player in advance in response to display prompts on the monitor screen to any one of nine separate height levels between the aforementioned minimum and maximum levels. Each level has a tolerance of plus or minus 3". The break level for all panels is the same, and the break level for each panel varies by no more than 3" over the total length of each panel. If the player does not elect a break level, then the processor 104 will automatically select 20" as the default break level. In this way, the game is customized to players of different heights.

As previously described, the preferred controller embodiment has enhanced play action, wherein a player's simultaneous or sequential activation of different (e.g., high or low) zones in spaces above the same or different panels provides a new control function, e.g., a new simulated movement of the video character 148.

Thus, as schematically shown in FIG. 23, the beam above each panel is divided into a high (H) zone activated by a player's hands, arms, shoulders and head, and a low (L) zone activated by the player's feet, knees, legs and hips.

The aforementioned conventional hand controller has buttons, A, B and C and a D-pad. Panels 401, 403, 405 and 407 on the controller 400 emulate the D-pad controls. Panels 404H and 406H emulate button A. Panels 402H and 402L emulate button B. Panels 408H and 408L emulate button C.

In addition to the above emulations, the simultaneous or sequential breaking of multiple beams, or single beams indifferent zones, produce "combination" moves for the video character. Thus, in the commercial embodiment, breaking beams 404H and 406H causes the game to start; breaking beams 401H and 403H causes the video character to make a diagonal right, upward movement; breaking beams 401H and 407H causes the video character to make a diagonal left, upward movement; breaking beams 405L and 403L causes the video character to make a diagonal right, downward movement; breaking beams 405L and 407L causes the video character to make a diagonal left, downward movement; and breaking beams 404L and 406L causes the game to pause or resume. Other combinations are, of course, contemplated.

While some embodiments of the invention have been described, it will be understood that the invention can be carried into practice with a number of variations, modifications, and adaptations, without departing from the spirit of the invention or from the scope of the claims.

We claim:

1. An apparatus for detecting an object, comprising:
    a) a support;
    b) emitter means supported by the support, and operative for transmitting radiation away from the support into an emission space;

c) sensor means supported by the support and having a sensing space, said sensor means being operative for receiving radiation directed by an object located in the sensing space to the sensor means, and for generating an electrical signal indicative of the presence of the object in the sensing space;

d) at least one of said sensor means and said emitter means including means for shaping at least one of said spaces to have a generally thin, screen-like volume having a cross-sectional width and a cross-sectional thickness less than said width substantially throughout said volume; and e) means for determining a position of the object in said at least one of said spaces relative to the support, and for generating a control signal indicative of the object position.

2. The apparatus according to claim 1, wherein the support rests on a support surface, and wherein the determining means determines the elevation of the object relative to the support surface.

3. The apparatus according to claim 2, wherein the determining means includes means for establishing a predetermined elevation above and below which a high and a low zone are respectively defined, and wherein the determining means generates low and high control signals when the object is respectively determined to be in the low and high zones.

4. The apparatus according to claim 3; and further comprising means for adjusting the predetermined elevation.

5. The apparatus according to claim 1, wherein the emitter means includes a light source for emitting a light beam, and wherein the sensor means includes a light sensor for sensing a reflection of the light beam by the object, and wherein the light source and the light sensor are mounted adjacent each other on the support.

6. The apparatus according to claim 5, wherein the support includes means for shielding the light source and the light sensor from stray light and electro-magnetic interference.

7. The apparatus according to claim 1; and further comprising calibration means, operative prior to operation of the determining means, for initially calibrating the apparatus with no object located in said at least one of said spaces.

8. The apparatus according to claim 1, wherein the support includes a plurality of interconnected sections, each section having a separate emitter means and a separate sensor means.

9. The apparatus according to claim 8, wherein the sections are arranged in a substantially closed configuration.

10. The apparatus according to claim 8; and further comprising latch means for interconnecting adjacent sections between a latched position in which the adjacent sections are interlocked, and an unlatched position in which the adjacent sections are unlocked.

11. The apparatus according to claim 1, wherein the determining means includes means for recognizing a plurality of positions of multiple objects in said at least one of said spaces, and for generating a combined control signal indicative of said plurality of positions.

12. The apparatus according to claim 11; and further comprising means on the support for forming an additional, generally thin, screen-like volume, and wherein the recognizing means recognizes the simultaneous presence of the multiple objects in the screen-like volumes.

13. The apparatus according to claim 11; and further comprising means on the support for forming an additional, generally thin, screen-like volume, and wherein the recognizing means recognizes the sequential presence of the multiple objects in the screen-like volumes.

14. A method of detecting an object, comprising the steps of:

a) transmitting radiation from an emitter on a support away from the support into an emission space;

b) mounting a sensor having a sensing space on the support;

c) receiving radiation directed by an object located in the sensing space to the sensor, and generating an electrical signal indicative of the presence of the object in the sensing space;

d) shaping at least one of said spaces to have a generally thin, screen-like volume having a cross-sectional width and a cross-sectional thickness less than said width substantially throughout said volume; and e) determining a position of the object in said at least one of said spaces relative to the support, and generating a control signal indicative of the object position.

15. The method according to claim 14, wherein the determining step includes establishing a predetermined elevation above and below which a high and a low zone are respectively defined, and wherein the determining step generates low and high control signals when the object is respectively determined to be in the low and high zones.

16. The method according to claim 15; and further comprising the step of adjusting the predetermined elevation.

17. The method according to claim 14; and further comprising the step of initially calibrating the sensor with no object located in said at least one of said spaces prior to performing the determining step.

* * * * *